United States Patent
Nagasaki et al.

(10) Patent No.: US 9,450,493 B2
(45) Date of Patent: Sep. 20, 2016

(54) VOLTAGE GENERATING APPARATUS FOR STABLY CONTROLLING VOLTAGE

(71) Applicant: CANON KABUSHIKI KAISHA, Tokyo (JP)

(72) Inventors: Osamu Nagasaki, Suntou-gun (JP); Atsuhiko Yamaguchi, Suntou-gun (JP); Naoki Nishimura, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/470,533

(22) Filed: Aug. 27, 2014

(65) Prior Publication Data

US 2015/0063855 A1 Mar. 5, 2015

(30) Foreign Application Priority Data

Sep. 4, 2013 (JP) ................................ 2013-183402
Sep. 4, 2013 (JP) ................................ 2013-183405

(51) Int. Cl.
G03G 15/16 (2006.01)
H02M 3/28 (2006.01)
G03G 15/00 (2006.01)
H02M 1/00 (2006.01)

(52) U.S. Cl.
CPC ............. *H02M 3/28* (2013.01); *G03G 15/166* (2013.01); *G03G 15/80* (2013.01); *H02M 2001/008* (2013.01)

(58) Field of Classification Search
CPC .. G03G 15/163; G03G 15/166; G03G 15/80; H02M 3/157
USPC ............... 399/88, 101; 323/282; 307/75, 80; 363/59, 60, 61
See application file for complete search history.

(56) References Cited

U.S. PATENT DOCUMENTS

| 4,721,365 | A | | 1/1988 | Nishimura |
| 5,436,821 | A | * | 7/1995 | Inoue ...................... H02M 3/07 363/60 |
| 5,831,844 | A | * | 11/1998 | Sudo .................... H02M 3/073 307/110 |
| 6,990,300 | B2 | | 1/2006 | Saito et al. |
| 7,265,479 | B2 | | 9/2007 | Yamaguchi et al. |
| 7,425,789 | B2 | | 9/2008 | Yasukawa et al. |
| 7,548,708 | B2 | | 6/2009 | Nagasaki et al. |
| 8,300,422 | B2 | | 10/2012 | Nagasaki |
| 8,437,652 | B2 | | 5/2013 | Nagasaki |
| 8,612,794 | B2 | * | 12/2013 | Kojima .................. H03K 3/011 327/105 |
| 8,750,744 | B2 | | 6/2014 | Nagasaki |

(Continued)

FOREIGN PATENT DOCUMENTS

| JP | 2004-145297 A | | 5/2004 |
| JP | 2006157662 A | * | 6/2006 |
| JP | 2008022623 A | * | 1/2008 |
| JP | 2009134577 A | * | 6/2009 |

(Continued)

*Primary Examiner* — Robert Beatty
(74) *Attorney, Agent, or Firm* — Fitzpatrick, Cella, Harper & Scinto

(57) ABSTRACT

A negative bias circuit outputs a DC voltage of a negative polarity. A positive bias circuit outputs a DC voltage of a positive polarity. The DC voltage of the positive polarity is used, for example, as a transfer voltage, and the DC voltage of the negative polarity is used as a cleaning voltage for cleaning toner. A cycle of the clock signal in a period during which the DC voltage of the first polarity is output is longer than a cycle of the clock signal in the period during which the voltage supplied to the load transits from the DC voltage of the first polarity to the DC voltage of the first polarity.

12 Claims, 15 Drawing Sheets

(56) References Cited

U.S. PATENT DOCUMENTS

| 2012/0027447 A1* | 2/2012 | Mukaibara ......... G03G 15/1645 399/88 |
| 2012/0027448 A1* | 2/2012 | Mukaibara ......... G03G 15/1645 399/88 |
| 2013/0004196 A1 | 1/2013 | Nagasaki |

FOREIGN PATENT DOCUMENTS

| JP | 2010-0074956 A | 4/2010 |
| JP | 2012-103631 A | 5/2012 |
| JP | 2012178911 A * | 9/2012 |
| JP | 2013-254066 A | 12/2013 |

* cited by examiner

FIG. 14

Table1

| OUTPUT TERMINAL VOLTAGE VOUT(Vn) | PRIMARY SIDE VOLTAGE Vi_n |
|---|---|
| 0V | 0V |
| ⋮ | ⋮ |
| -1kV | 6.67V |
| ⋮ | ⋮ |
| -3kV | 20V |

Table3

| OUTPUT TERMINAL VOLTAGE VOUT(Vp) | PRIMARY SIDE VOLTAGE Vi_p |
|---|---|
| 0V | 0V |
| ⋮ | ⋮ |
| 1kV | 6.67V |
| ⋮ | ⋮ |
| 3kV | 20V |

Table2

| POTENTIAL DIFFERENCE / SECONDARY TRANSFER LOAD | POTENTIAL DIFFERENCE LARGE (GREATER THAN OR EQUAL TO 3 kV) | POTENTIAL DIFFERENCE MEDIUM (LESS THAN 3 kV TO GREATER THAN OR EQUAL TO 1 kV) | POTENTIAL DIFFERENCE SMALL (LESS THAN 1 kV) |
|---|---|---|---|
| SECONDARY TRANSFER LOAD LARGE (ENVIRONMENTAL FLUCTUATION) | +10V | +7V | +5V |
| SECONDARY TRANSFER LOAD MEDIUM (ENVIRONMENTAL FLUCTUATION) | +7V | +5V | +3V |
| SECONDARY TRANSFER LOAD SMALL (ENVIRONMENTAL FLUCTUATION) | +5V | +3V | +1V |

VOLTAGE GENERATING APPARATUS FOR STABLY CONTROLLING VOLTAGE

BACKGROUND OF THE INVENTION

1. Field of the Invention

The present invention generally relates to voltage generating apparatuses, and relates to a voltage generating apparatus for supplying a DC voltage to an electrophotographic image forming apparatus.

2. Description of the Related Art

An image forming apparatus using an electrophotographic process transfers a toner image carried on an intermediate transfer belt to a sheet by a secondary transfer roller. To facilitate the transfer, a transfer voltage of several kV is applied to the secondary transfer roller. In connection to this, there are cases where the toner remaining on the intermediate transfer belt adheres to the secondary transfer roller, and is further transferred from the secondary transfer roller to the back face of the sheet (back staining phenomenon). In Japanese Patent Laid-Open No. 2004-145297, application of a cleaning reverse bias before the secondary transfer and after completion of the secondary transfer in order to suppress such a phenomenon is proposed. This reverse bias causes the toner to be reverse transferred from the secondary transfer roller to the intermediate transfer belt, and the toner is collected from the intermediate transfer belt by a cleaning mechanism.

Incidentally, it is conceivable to shorten the sheet interval (the interval between the trailing end of the preceding sheet and the leading end of the subsequent sheet) in order to shorten the time required at the time of successively forming images. However, if the sheet interval time is shortened, the time during which the cleaning reverse bias is applied is also shortened, and therefore, cleaning may be insufficient. In order to switch the secondary transferring normal bias to the cleaning reverse bias, a certain amount of time is required to raise the reverse bias. For this reason, not all of the sheet interval time can be used for cleaning. Sufficient cleaning can be performed within a short sheet interval time if the raising time for the reverse bias during switching from the secondary transferring normal bias to the reverse bias is shortened. However, if the raising time for the reverse bias is to be shortened, undershoot occurs and the reverse bias cannot be easily stabilized.

SUMMARY OF THE INVENTION

Therefore, the present invention stably controls a bias even if the raising time for the bias is shortened.

The present invention provides a voltage generating apparatus comprising the following elements. A first power supply unit is configured to output a DC voltage of a first polarity. A second power supply unit is configured to output a DC voltage of a second polarity that is different from the first polarity. The voltage generating apparatus selectively supplies the DC voltage of the first polarity from the first power supply unit or the DC voltage of the second polarity from the second power supply unit to a load. The first power supply unit may include the following elements. A control unit is configured to generate a clock signal. A switch unit is configured to perform switching in accordance with the clock signal supplied from the control unit. A cycle of the clock signal in a period during which the DC voltage of the first polarity is output is longer than a cycle of the clock signal in the period during which the voltage supplied to the load transits from the DC voltage of the first polarity to the DC voltage of the first polarity.

Further features of the present invention will become apparent from the following description of exemplary embodiments (with reference to the attached drawings).

BRIEF DESCRIPTION OF THE DRAWINGS

FIG. 14 shows examples of tables.

DESCRIPTION OF THE EMBODIMENTS

The present invention is characterized in that, when the voltage supplied to a load is switched from a voltage of a second polarity (e.g., a transfer voltage) to a voltage of a first polarity (e.g., a cleaning voltage), a capacitor contributing to the voltage of the first polarity is charged in advance. This makes it possible to raise the voltage of the first polarity in a short time. However, when the raising time for the voltage of the first polarity is to be shortened, undershoot occurs, making the voltage of the first polarity difficult to be stabilized. Therefore, according to Embodiment 1, a clock signal is thinned out in a period during transition from a DC voltage of a second polarity to a DC voltage of a first polarity. Accordingly, the DC voltage of the first polarity can be stably controlled.

Basic Configuration of Voltage Generating Apparatus

Figure 1:
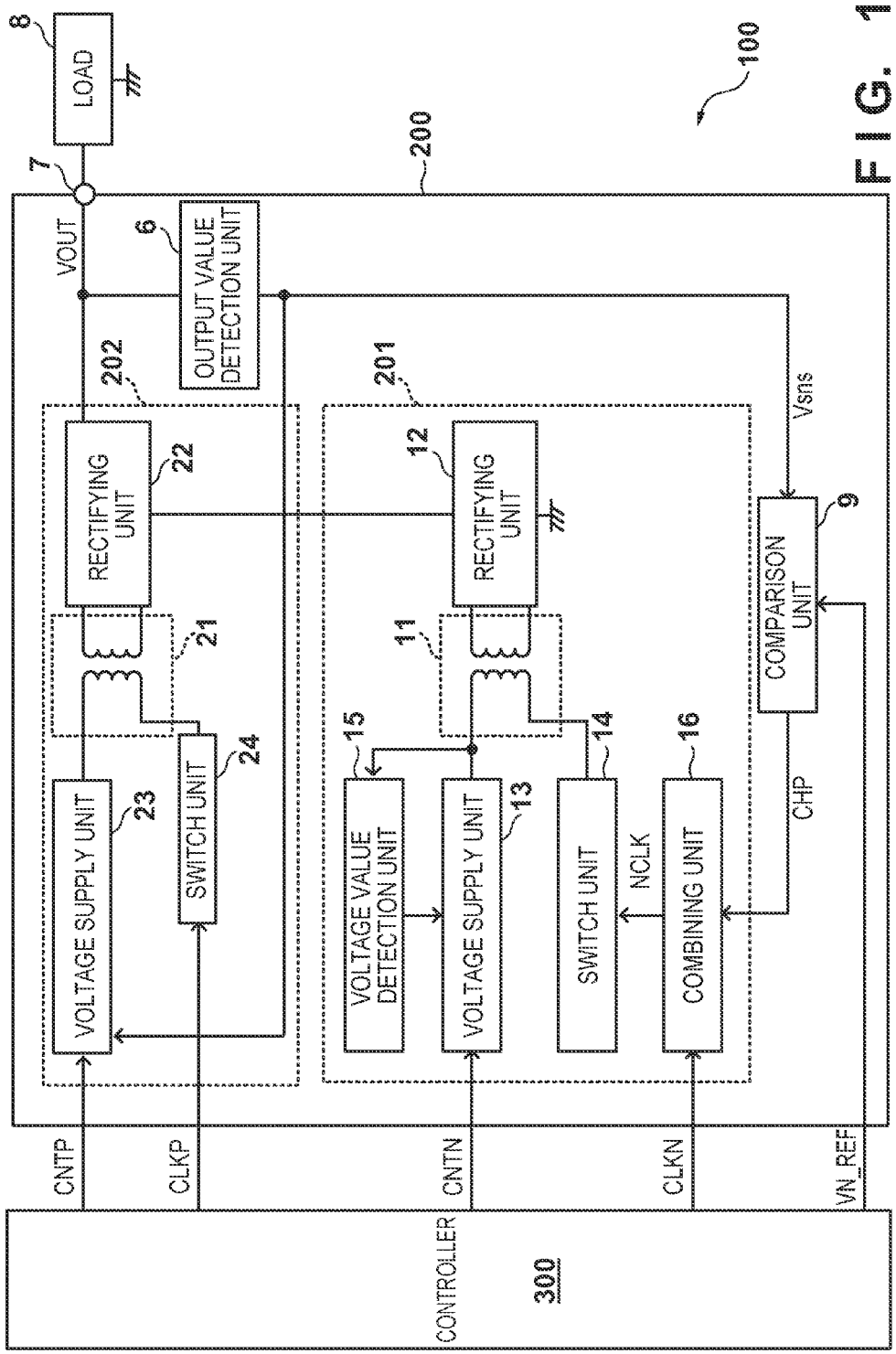
FIG. 1 is a functional block diagram of a voltage generating apparatus.

With reference to FIG. 1, a description will be given of a voltage generating apparatus 100 that selectively supplies a load 8 to a DC voltage of a first polarity or a DC voltage of a second polarity. The voltage generating apparatus 100 includes a high-voltage power supply 200 and a controller 300. The high-voltage power supply 200 is, for example, a voltage generating apparatus that applies a high voltage to a secondary transfer roller. A negative bias circuit 201 is an example of a first power supply unit configured to output the DC voltage of the first polarity. Here, the negative bias circuit 201 outputs a DC voltage of a negative polarity (e.g., −1 kV to −2 kV) as a cleaning voltage. A positive bias circuit 202 is an example of a second power supply unit configured to output the DC voltage of the second polarity. Here, the positive bias circuit 202 outputs a DC voltage of a positive polarity (e.g., 4 kV) as a secondary transfer voltage. The controller 300 controls the negative bias circuit 201 and the positive bias circuit 202, and causes an output terminal 7 to selectively output a voltage to the load 8. The controller 300 outputs a positive control signal CNTP and a positive clock signal CLKP to the positive bias circuit 202. The controller 300 supplies a negative control signal CNTN and a negative clock signal CLKN to the negative bias circuit 201. The positive or negative that is appended to each control signal does not indicate the polarity of the amplitude of the control signal, but merely indicates which of the positive bias circuit 202 and the negative bias circuit 201 the control signal contributes to.

In the positive bias circuit 202, a voltage supply unit 23 is a circuit that supplies a voltage serving as a reference to the primary side of a voltage conversion unit 21 in accordance with the positive control signal CNTP from the controller 300. A switch unit 24 is a circuit that switches the primary side voltage of the voltage conversion unit 21 by using the positive clock signal CLKP. A rectifying unit 22 is a circuit that rectifies the secondary side voltage of the voltage conversion unit 21 from AC to DC. An output value detection unit 6 is a circuit that divides an output terminal voltage VOUT of the output terminal 7 and feeds back the divided voltage to the voltage supply unit 23. Thereby, the voltage supply unit 23 stably controls the output terminal voltage VOUT.

In the negative bias circuit 201, a voltage supply unit 13 is a circuit that supplies a voltage serving as a reference to the primary side of a voltage conversion unit 11 in accordance with the negative control signal CNTN from the controller 300. A switch unit 14 is a circuit that switches the primary side of the voltage conversion unit 11 by using the negative clock signal CLKN. A rectifying unit 12 is a circuit that rectifies the secondary side output voltage of the voltage conversion unit 11 from AC to DC. A voltage value detection unit 15 is a circuit that divides the primary side voltage of the voltage conversion unit 11 and feeds back the divided voltage to the voltage supply unit 13. Thereby, the voltage supply unit 13 stably controls the primary side voltage of the voltage conversion unit 11. A comparison unit 9 compares a reference voltage VN_REF that is set by the controller 300 and a detected voltage Vsns that is output by the output value detection unit 6. A combining unit 16 functions as a thinning-out unit configured to thin out the negative clock signal CLKN in accordance with the result of comparison made by the comparison unit 9. The output value detection unit 6 functions as a voltage detection unit configured to detect the output terminal voltage VOUT supplied to the load 8. In Embodiment 1, the combining unit 16 starts thinning out the clock signal when the detected voltage Vsns reaches the reference voltage VN_REF. Thereby, the output terminal voltage VOUT is stably controlled.

Figure 2:
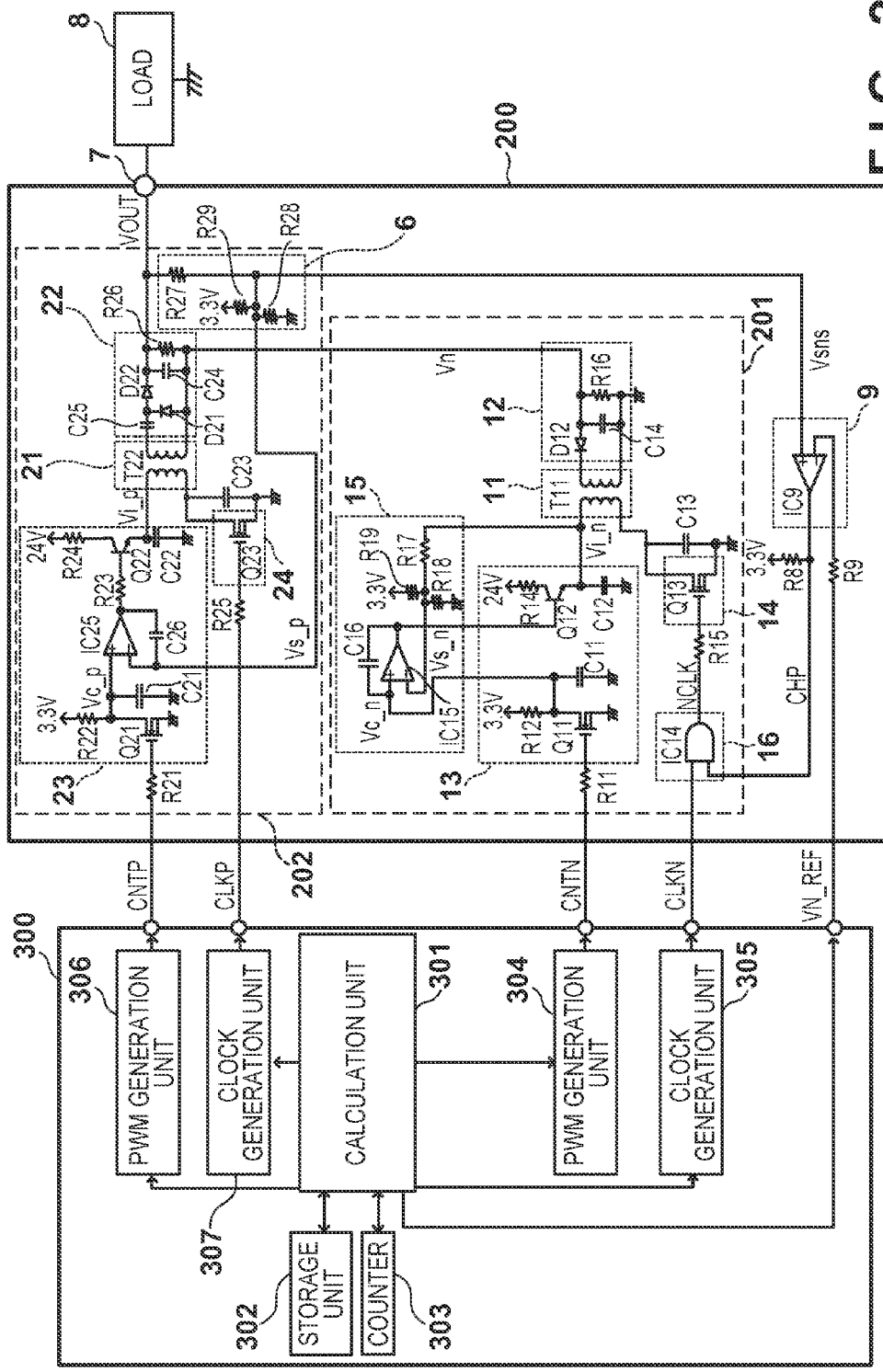
FIG. 2 is a circuit diagram of the voltage generating apparatus.

FIG. 2 shows circuit diagrams of the controller 300 and the high-voltage power supply 200. A calculation unit 301, a storage unit 302, a counter 303, PWM generation units 304 and 306, clock generation units 305 and 307, and so forth are included inside the controller 300. The PWM generation unit 306 is a circuit that generates the positive control signal CNTP and supplies the positive control signal CNTP to the positive bias circuit 202. The start of the output, the stop of the output, the duty ratio, and the like of the control signal CNTP are specified by the calculation unit 301. The clock generation unit 307 is a circuit that generates the positive clock signal CLKP and supplies the positive clock signal CLKP to the positive bias circuit 202. The start of the output, the stop of the output, the duty ratio, and the like of the positive clock signal CLKP are specified by the calculation unit 301. The PWM generation unit 304 is a circuit that generates the negative control signal CNTN and supplies the negative control signal CNTN to the negative bias circuit 201. The start of the output, the stop of the output, the duty ratio, and the like of the negative control signal CNTN are specified by the calculation unit 301. The clock generation unit 307 is a circuit that generates the negative clock signal CLKN and supplies the negative clock signal CLKN to the negative bias circuit 201. The start of the output, the stop of the output, the duty ratio, and the like of the negative clock signal CLKN are specified by the calculation unit 301. The calculation unit 301 controls the counter 303, the PWM generation units 304 and 306, the clock generation units 305 and 307, and so forth in accordance with the control data and programs stored in the storage unit 302. That is, the calculation unit 301 functions as a controlling entity for various controls performed in the controller 300.

In the voltage supply unit 23, the control signal CNTP is supplied via a resistor R21 to the gate of a FET Q21. "FET" is an abbreviation of a field-effect transistor. The drain of the FET Q21 is connected to a 3.3 V power source via a resistor R22. A capacitor C21 is provided between the drain and source of the FET Q21. The capacitor C21 is charged in accordance with the control signal CNTP, and the voltage across the capacitor C21 is Vc_p. That is, Vc_p is the voltage serving as a reference for the primary side voltage of a transformer T22. One end of the capacitor C21 is grounded, and the other end thereof is connected to a non inverting input terminal of an operational amplifier IC25. The detected voltage Vs_p from the output value detection unit 6 is input to an inverting input terminal of the operational amplifier IC25. That is, the operational amplifier IC25 outputs a signal in dependence on the result of comparison between Vc_p and Vs_p. A capacitor C26 is connected between the inverting input terminal and an output terminal of the operational amplifier IC25. The output terminal of the operational amplifier IC25 is connected to the base of a transistor Q22 via a resistor R23. The collector of the transistor Q22 is connected to a 24 V power source via a resistor R24. The source of the transistor Q22 is connected to one end of a capacitor C22 and one end of the primary winding of the transformer T22. The other end of the capacitor C22 is grounded. That is, Vi_p, which is the voltage across the capacitor C22, is supplied as the primary side voltage of the transformer T22. The other end of the primary winding of the transformer T22 is connected to the drain of a FET Q23. The source of the FET Q23 is grounded. A capacitor C23 is provided between the drain and source of the FET Q23. The FET Q23 is a main element of the switch unit 24 and is a switching element. The clock signal CLKP is input via a resistor R25 to the gate of the FET Q23.

In the positive bias circuit 202, the clock signal CLKP is a pulse signal for switching and driving the transformer T22 of the voltage conversion unit 21, and it is possible to use, for example, a rectangular wave fixed at 50 kHz, a duty ratio of 50%, and an amplitude 3.3 V. When the clock signal CLKP is input to the gate of the FET Q23, the FET Q23 is repeatedly turned on and off in accordance with the clock signal CLKP. By turning the FET Q23 on and off, the voltage across the electrolytic capacitor C22 (primary side voltage) is applied to the primary winding of the transformer T22 as a switched, pulsed waveform. This voltage is boosted by the transformer T22 into a secondary side voltage. The cycle of the secondary side voltage is identical to the cycle of the primary side voltage. The waveform of the secondary side voltage is a switched, pulsed voltage waveform.

The rectifying unit 22 includes two rectifier circuits composed of combinations of high-voltage diodes D21 and D22 with high-voltage capacitors C24 and C25, and rectifies and smoothes the secondary side voltage. More specifically, the high-voltage capacitor C25 and the high-voltage diode D21 constitute one of the rectifier circuits, and the high-voltage capacitor C24 and the high-voltage diode D22 constitute the other of the rectifier circuits. The rectifying unit 22 is a voltage-doubler rectifier circuit called a "Cockcroft-Walton circuit", and outputs a voltage proportional to the number of the rectifier circuits. For example, it is assumed that the voltage across the electrolytic capacitor C22 that corresponds to the primary side voltage of the transformer T22 reaches a maximum voltage. At this time, base on the ratio of the number of turns between the primary winding and the secondary winding of the transformer T22, the secondary side voltage of the transformer T22 is approximately +2 kV. When a current that has been generated on the secondary side of the transformer T22 flows in the forward direction of the high-voltage diode D21, a positive charge is accumulated in the high-voltage capacitor C24. This causes a potential difference of 4 kV in the high-voltage capacitor C24. The output terminal voltage VOUT of the output terminal 7 in terms of the ground potential is a DC voltage of +4 kV. That is, the voltage that can be output by the transformer T22, namely, +2 kV, is doubled to +4 kV. Although FIG. 2 shows a two-stage rectifier circuitry for simplification of illustration, a rectifier circuitry with three or more stages (multi stage rectifier circuitry) may be used depending on the specifications of the transformer T22, the output voltage range, and the like. A resistor R26 is connected to the high-voltage capacitor C24.

A detection resistor R27 is a voltage detection resistor for detecting the output terminal voltage VOUT emerging at the output terminal 7 and for controlling the detected output terminal voltage VOUT to a fixed voltage. As the detection resistor R27, it is possible to use a high breakdown voltage, accurate (e.g., having a resistance value tolerance of ±1%) resistor. A voltage Vs_p, which is generated as a result of dividing the output terminal voltage VOUT of the output terminal 7 by resistors R27, R28, and R29 is input to the inverting input terminal (minus terminal) of the operational amplifier IC25. The voltage Vs_p is proportional to the output terminal voltage VOUT, and represents the output terminal voltage VOUT. The operational amplifier IC25 controls the base voltage of the transistor Q22 such that the output set voltage Vc_p connected to the non inverting input terminal (plus terminal) and the voltage Vs_p of the inverting input terminal are equal. When the voltage Vs_p becomes greater than the output set voltage Vc_p of the inverting input terminal, the inverting input of the operational amplifier IC25 becomes greater than the non inverting input thereof. Therefore, the output of the operational amplifier IC25 is reduced, and the operational amplifier IC25 turns the transistor Q22 off, as a result of which the primary side voltage Vi_p, which is the voltage across the electrolytic capacitor C22, is lowered. Consequently, the primary side voltage applied to the primary winding of the transformer T22 is reduced, and thus the secondary side voltage is also reduced. On the other hand, when the voltage Vs_p input to the inverting input terminal becomes smaller than the output set voltage Vc_p, the operational amplifier IC25 turns the transistor Q22 on. The voltage across the electrolytic capacitor C22 rises, which increases the absolute value of the output terminal voltage VOUT. Through the above-described control, the output terminal voltage VOUT of the output terminal 7 is controlled to a fixed voltage (e.g., +4 kV).

In order for the secondary transfer to be performed favorably in the image forming apparatus, it is important that a sufficient transfer current is passed through the sheet. The transfer current varies depending, for example, on the environment (atmosphere) in which the image forming apparatus is installed, the resistance value of the intermediate transfer belt, the resistance value of the secondary transfer roller, and the type of sheet, and it is therefore necessary to change the value of the secondary transfer voltage accordingly. For this reason, the value of the output set voltage Vc_p is able to be changed in accordance with the control signal CNTP supplied from the controller 300. By changing the value of the output set voltage Vc_p, the output terminal voltage VOUT of the output terminal 7 can be controlled within the range from 0 V to +4 kV, for example. Examples of the method for changing the value of the output set voltage Vc_p include a method that rectifies and smoothes the control signal CNTP output from the controller 300 and uses the voltage as the output set voltage Vc_p. Alternatively, it is possible to adopt a method that converts a digital data signal output from the controller 300 via a DA converter into an analog value and uses the value as the output set voltage Vc_p. FIG. 2 shows the circuit used in the former method.

In the negative bias circuit 201, the voltage supply unit 13 includes a FET Q11 that turns on and off the control signal CNTN input via a resistor R11. The drain of the FET Q11 is connected to a 3.3 V power source via a resistor R12. A capacitor C11 is connected between the drain and source of the FET Q11. The capacitor C11 is charged in accordance with the clock signal CLKN. The voltage across the capacitor C11 is a reference voltage Vc_n serving as a reference for the primary side voltage of a transformer T11, and is input to a non inverting input terminal of an operational amplifier IC15 of the voltage value detection unit 15. Vs_n, which is a voltage generated as a result of dividing the primary side voltage Vi_n of the transformer T11 by resistors R17, R19, and R18 is input to an inverting input terminal of the operational amplifier IC15. The voltage Vs_n is proportional to the primary side voltage Vi_n, and represents the primary side voltage Vi_n. An output terminal of the operational amplifier IC15 is connected to the base of a transistor Q12 of the voltage supply unit 13. A capacitor C16 is connected between the output terminal and the non inverting input terminal of the operational amplifier IC15. The collector of the transistor Q12 is connected to a 24 V power source via a resistor R14. The emitter of the transistor Q12 is connected to a capacitor C12. That is, the capacitor C12 is charged in accordance with the result of comparison between the reference voltages Vc_n and Vs_n. The voltage across the capacitor C12 is the primary side voltage Vi_n, and is applied to the primary winding of the transformer T11.

The clock signal CLKN is a pulse signal for switching and driving the transformer T11. As the clock signal CLKN, it is possible to use, for example, a rectangular wave fixed at 50 kHz, a duty ratio of 50%, and an amplitude of 3.3 V. When the clock signal CLKN is input to the gate of a FET Q13, the FET Q13 is repeatedly turned on and off in accordance with the clock signal CLKN. By turning the FET Q13 on and off, the primary side voltage Vi_n has a switched, pulsed waveform, and is applied to the primary winding of the transformer T11. The transformer T11 boosts the primary side voltage Vi_n to generate the secondary side voltage. The primary side voltage Vi_n and the secondary side voltage have an identical cycle, and both have a pulsed voltage waveform. The secondary side voltage is rectified and smoothed into a DC voltage by a high-voltage diode D12 and a high-voltage capacitor C14 of the rectifying unit 12. Comparing the positive bias circuit 202 and the negative bias circuit 201, the diode D12 is disposed in the opposite direction with respect to the diode D22. The purpose of this is to make the negative bias and the positive bias have opposite polarities. The rectifying unit 12 is a single-stage voltage rectifier circuit. It is assumed that when the voltage across the electrolytic capacitor C12 that corresponds to the primary side voltage of the transformer T11 is a maximum voltage, for example, the secondary side voltage of the transformer T11 is +2 kV. In the rectifying unit 12, when a current generated on the secondary side of the transformer T11 flows in the forward direction of the high-voltage diode D12, a negative charge is accumulated in the high-voltage capacitor C14. That is, a potential difference of 2 kV is generated across the high-voltage capacitor C14, and this is generated as the output voltage Vn. The output voltage Vn in terms of the ground potential is a DC voltage of −2 kV. A resistor R16 is connected in parallel to the high-voltage capacitor C14.

The output voltage Vn is output as the output terminal voltage VOUT to the output terminal 7 via the high breakdown voltage resistor R26 (generally called a bleeder resistor), and is supplied to the load 8. The output voltage Vn is divided by the high breakdown voltage resistor R26 and the impedance of the load 8. If the output voltage Vn is −2 kV, then the output terminal voltage VOUT is 1.5 kV, for example. Thus, the absolute value of the output terminal voltage VOUT drops below the absolute value of the output voltage Vn. Although a single-stage voltage rectifier circuit is used as the rectifying unit 12 in FIG. 2 for simplification of illustration, a multi stage rectifier circuit with two or more stages may be used depending on the specifications of the transformer and the output voltage range.

The positive bias circuit 202 and the negative bias circuit 201 are also different with regard to the voltage detection circuit. In the positive bias circuit 202, the output terminal voltage VOUT of the output terminal 7 is detected by the detection resistor R27, and is controlled to a predetermined voltage. On the other hand, in the negative bias circuit 201, the primary side voltage Vi_n, which is the voltage across the electrolytic capacitor C12, is detected by the detection resistor R17, and is controlled to a fixed voltage. A high breakdown voltage resistor need not be selected as the detection resistor R17 of the negative bias circuit 201, unlike the detection resistor R27 of the positive bias circuit 202. This is because no high-voltage pattern exists around the detection resistor R17. Since the detection resistor R17 detects the primary side voltage Vi_n, it is also possible to use an accurate (e.g., having a resistance value tolerance of ±1%) resistor.

As described above, the voltage Vs_n, which is generated by dividing the primary side voltage Vi_n of the electrolytic capacitor C12 by the resistors R17, R18, and R19, is input to the inverting input terminal of the operational amplifier IC15. The operational amplifier IC15 controls the base voltage of the transistor Q12 such that the output set voltage Vc_n connected to the non inverting input terminal and the voltage Vs_n of the inverting input terminal are equal. The negative bias circuit 201 can accurately maintain the primary side voltage Vi_n of the electrolytic capacitor C12 constant. However, the output voltage Vn and the output terminal voltage VOUT generated at the output terminal 7 via the high breakdown voltage resistor R26 are dependent on manufacturing variations in properties of the transformer T11, variations in the resistance value of the secondary transfer roller serving as the load 8, and so forth. Accordingly, the negative bias is less accurate as compared with the positive bias, which directly controls the output terminal voltage VOUT. However, the negative bias is used mainly for cleaning the secondary transfer roller. Thus, the image forming apparatus does not require a highly accurate negative bias, and no practical problem will arise.

As with the primary side voltage Vi_p of the positive bias, the value of the primary side voltage Vi_n of the negative bias is able to be changed by the controller 300. The controller 300 changes the primary side voltage Vi_n of the electrolytic capacitor C12 by changing the output set voltage Vc_n via the control signal CNTN. The output terminal voltage VOUT corresponding to the primary side voltage Vi_n is controlled within the range from 0 V to −1.5 kV, for example. The controller 300 may set a negative bias suitable for the cleaning condition such as the usage environment of the image forming apparatus.

Figure 3:
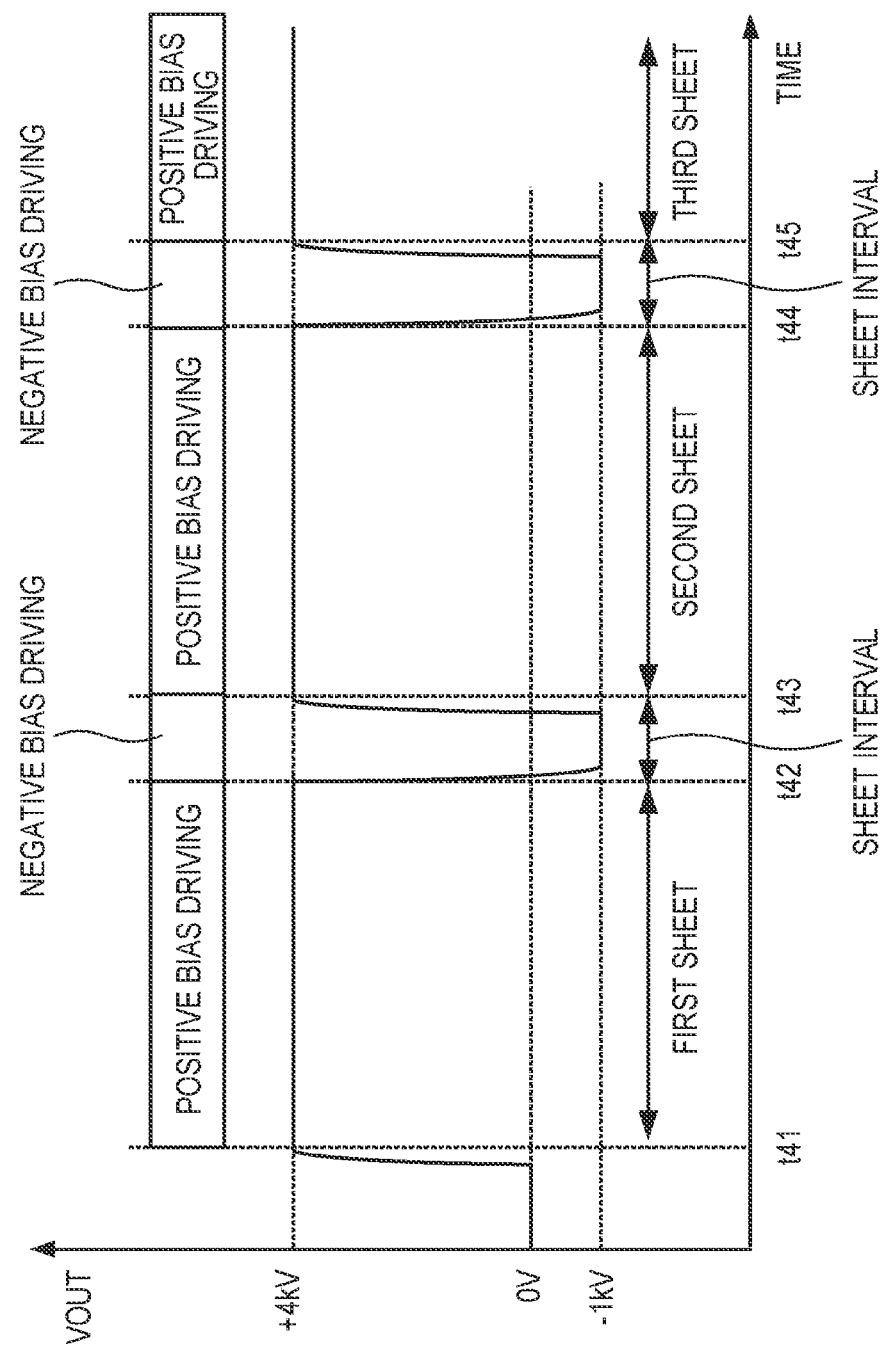
FIG. 3 is a graph showing how a positive bias and a negative bias are alternately switched.

As shown by FIG. 3, the positive bias is output during periods t41 to t42, t43 to t44, and t45 and afterward during which the secondary transfer is performed, and the negative bias is output during sheet interval times t42 to t43, and t44 to t45 during which the cleaning sequence for the secondary transfer roller is executed. Note that the sheet interval time as used herein refers to the time interval between the trailing end of the preceding sheet and the leading end of the subsequent sheet. In recent years, the sheet interval time is becoming very short. Accordingly, it is necessary to raise the negative bias at high speed in order to fully utilize the sheet interval time for cleaning.

Description of Characterizing Portion of the Present Embodiment

In FIG. 1, the comparison unit 9 and the combining unit 16 are provided, and the controller 300 outputs the reference voltage VN_REF, which is a negative threshold voltage signal. In the present embodiment, the negative reference voltage VN_REF is described as an analog DC signal that is variable from 0 V to 3.3 V, for example.

The output terminal voltage VOUT is divided into a low voltage by the output value detection unit 6. The divided low voltage is fed back to the positive voltage supply unit 23, and is input to the comparison unit 9 as a voltage detection signal (detected voltage Vsns). The comparison unit 9 compares the detected voltage Vsns and the negative reference voltage VN_REF output from the controller 300. The comparison unit 9 outputs a chopping signal CHP as "H" or "L" level in accordance with the result of comparison. "H" means a high level, and "L" means a low level. The chopping signal CHP is input to the combining unit 16. The combining unit 16 logically combines the negative clock signal CLKN and the chopping signal CHP to generate a new combined clock signal NCLK. The combined clock signal NCLK is input via a resistor R15 to the gate of the FET Q13 of the switch unit 14, and is used as a switching signal for switching the transformer T11.

Embodiment 1 is characterized by the operation of the negative bias circuit 201 at the time of switching from the positive voltage output state to the negative bias output state. Before the positive bias circuit 202 is turned off, the primary side voltage Vi_n of the voltage conversion unit 11 is set to a first target voltage (e.g., 22 V) in advance. That is, the capacitor C12 is charged in advance, thus achieving the high-speed raising of the negative bias. At the same time as the positive bias circuit 202 is turned off, the negative bias circuit 201 starts switching. The controller 300 changes the target voltage (22 V->18 V) once or stepwise as the output terminal voltage VOUT drops, and the primary side voltage Vi_n is adjusted. This makes the drop of the negative output voltage Vn gradual, thus suppressing undershoot. When the output terminal voltage VOUT reaches a goal voltage (e.g., 0 kV) (i.e., when Vsns reaches VN_REF), the combining unit 16 starts chopping the clock signal CLKN. Thereby, the negative output voltage Vn is stably controlled to the final goal voltage (e.g., −1 kV).

Description of Circuit and Operation

As shown by FIG. 2, the comparison unit 9 is constituted by a comparator IC9. The detected voltage Vsns is input to the plus terminal of the comparator IC9. The negative reference voltage VN_REF is input to the minus terminal of the comparator IC9. For example, if Vsns exceeds VN_REF, the chopping signal CHP output by the comparator IC9 is "H". On the other hand, if Vsns is less than or equal to VN_REF, the chopping signal CHP is "L". The combining unit 16 is constituted by an AND circuit IC14, and the AND circuit IC14 ANDs the negative clock signal CLKN and the chopping signal CHP. The AND circuit IC14 outputs the combined clock signal NCLK as the AND. For example, if the chopping signal CHP is "H", then the negative clock signal CLKN is directly output as the combined clock signal NCLK. In contrast, if the chopping signal CHP is "L", then the "L" level voltage is output as the combined clock signal NCLK, independently of the negative clock signal CLKN. That is, the state in which the transformer T11 is not switched is achieved, and therefore, the absolute value of the output voltage Vn, which is the secondary side voltage of the transformer T11, is reduced.

Figure 4:
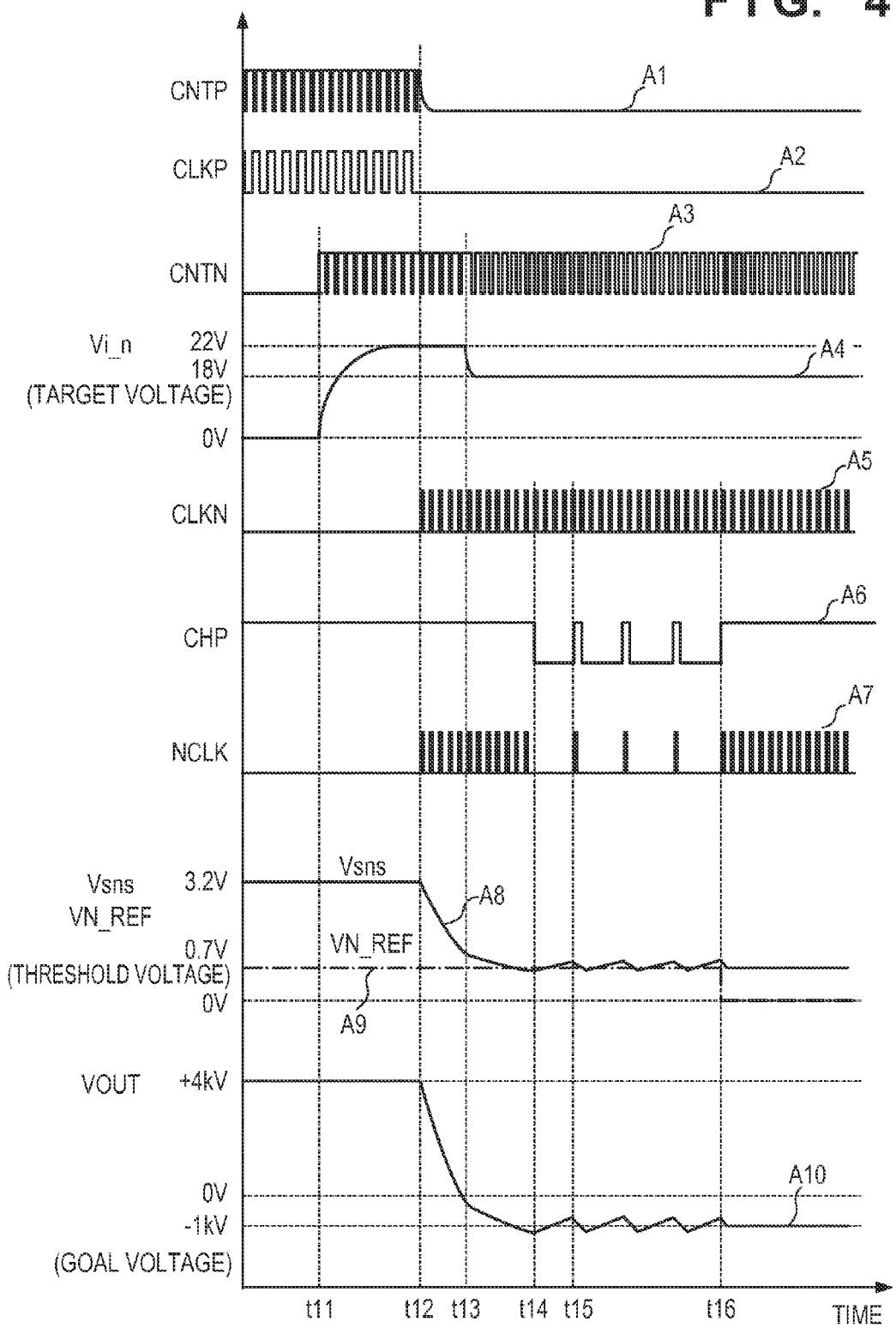
FIG. 4 is a graph showing waveforms of various types of signals or voltages.
Figure 5:
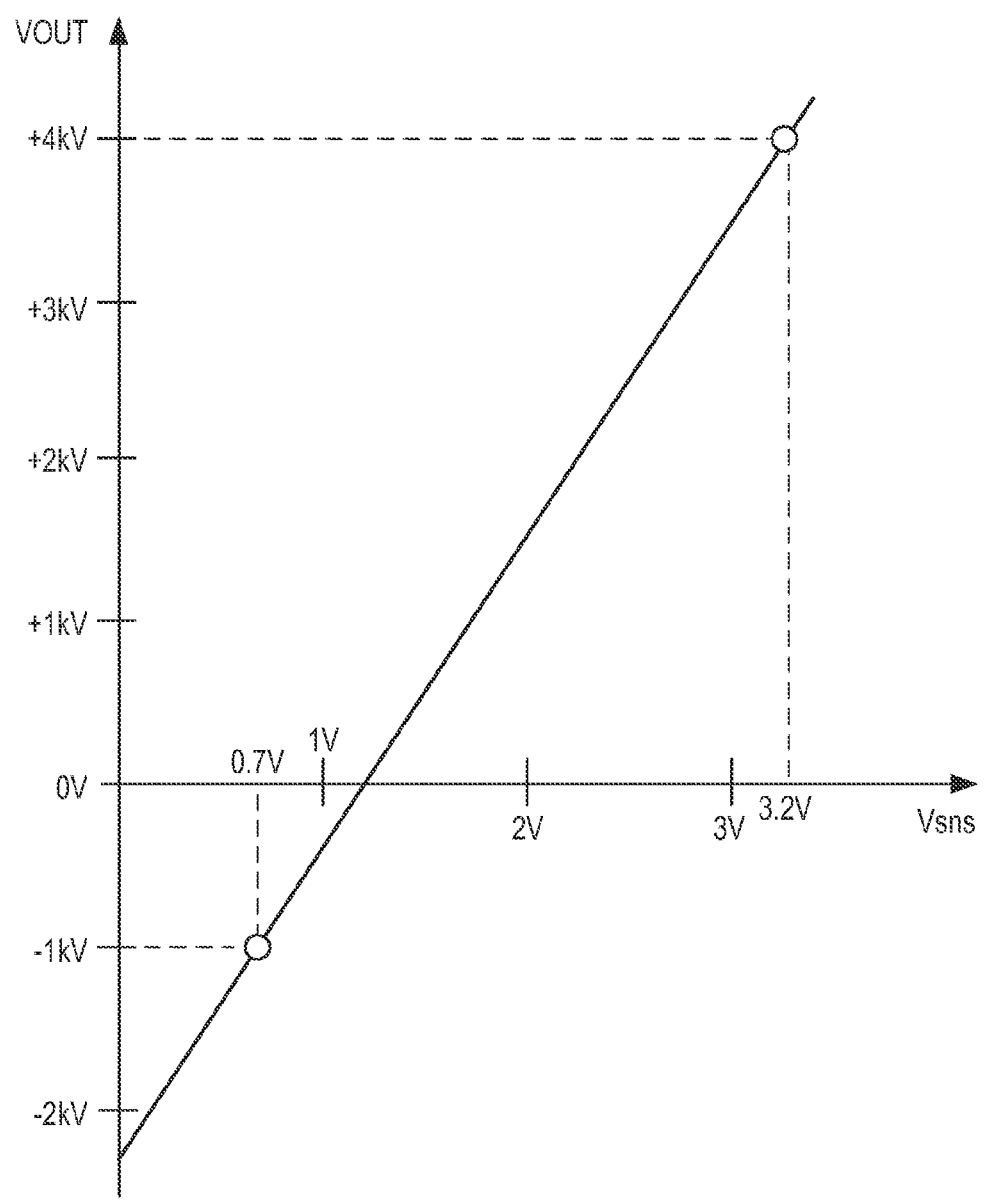
FIG. 5 is a graph showing the relationship between an output terminal voltage and a divided voltage thereof.

A description will be given of the voltage waveforms of various signals and output terminals contributing to the circuit operation at the time of switching from the positive bias output state to the negative bias output state at high speed with reference to FIG. 4. Note that the specific numerical values used in the description of the present embodiment are merely representative numerical values for facilitating the understanding. Needless to say, these numerical values may vary depending on the circuitry and the usage conditions. Additionally, the present embodiment will be described based on a high-voltage power supply 200 in which the output terminal voltage VOUT and the detected voltage Vsns have a relationship as shown in FIG. 5.

As the initial state, the positive control signal CNTP (waveform A1) is input to the voltage supply unit 23 at a frequency of 13 kHz, a duty ratio of 80%, and an amplitude of 3.3 V. The positive clock signal CLKP (waveform A2) is input to the switch unit 24 at a frequency of 50 kHz, a duty ratio of 50%, an amplitude of 3.3 V, and a predetermined frequency. Until a timing t12 at which the input of these signals is maintained, the output terminal voltage VOUT (waveform A10) maintains a positive output voltage of +4 kV.

In the positive voltage output state, the negative control signal CNTN (waveform A3) is supplied to the voltage supply unit 13 from the controller 300 at a timing t11. Here, the parameters of the negative control signal CNTN are a frequency of 13 kHz, a duty ratio of 90%, and an amplitude of 3.3 V. At this time, the primary side voltage Vi_n (waveform A4) of the negative transformer T11 rises from 0 V to 22 V with a predetermined time constant. The rising time constant of the primary side voltage Vi_n is determined by the charging time to the electrolytic capacitor C12 or the like. A second value (18 V), which is a target value, is not initially used as the primary side voltage Vi_n of the negative transformer T11 in order to rapidly raise the negative bias circuit 201. Instead, the calculation unit 301 sets the negative control signal CNTN for the PWM generation unit 304 so as to provide a first value (22 V) that can attain an output voltage with a higher absolute value. The second value (18 V) corresponds to a final goal voltage (−1 kV), and the first value (22 V) corresponds to a voltage (−2 kV) having a greater absolute value than that of the final goal voltage. Thus, VOUT can be changed at high speed by setting the primary side voltage Vi_n to the first value, which is greater than the second value. Note, however, that undershoot tends to occur in this case, and thus, the voltage is switched from the first value (22 V) to the second value (18 V) in the middle of the process.

At the timing t12, the electrolytic capacitor C12 on the primary side of the transformer T11 is sufficiently charged, and the primary side voltage Vi_n is stabilized at 22 V. The time from the timing t11 to the timing t12 is determined in advance so as to be longer than or equal to the charging time in which the electrolytic capacitor C12 is sufficiently charged, and is stored in the storage unit 302. The calculation unit 301 manages various timings using the counter 303. At the timing t12, the controller 300 stops the positive bias circuit 202, and at the same time, causes the negative bias circuit 201 to start outputting. First, the positive control signal CNTP and the positive clock signal CLKP are stopped. At the same time, the negative clock signal CLKN is supplied from the controller 300 at a frequency of 50 kHz, a duty ratio of 25%, and an amplitude of 3.3 V (waveform A5). The negative clock signal CLKN is generated by combining the chopping signal CHP (waveform A6), which is "H" at this point, and the AND circuit IC14. Accordingly, as the combined clock signal NCLK, the negative clock signal CLKN is directly generated and output (waveform A7). Through the input of the combined clock signal NCLK, the negative transformer T11 is operated, and the output terminal voltage VOUT starts dropping from +4 kV. The dropping time constant of the output terminal voltage VOUT is dependent on the time constant of the negative rectifying unit 12, the residual charge remaining in the smoothing high-voltage capacitor C24 included in the positive rectifying unit 22, the residual charge remaining in the capacitive component of the load 8, and the like. In synchronization with this, the detected voltage Vsns also drops (waveform A8). Note that at this point the relationship between the detected voltage Vsns and the negative reference voltage VN_REF (here, 0.7 V) is still Vsns>VN_REF.

At a timing t13, the controller 300 controls the PWM generation unit 304 to change the duty ratio of the negative control signal CNTN from 90% to 70%. Thereby, the primary side voltage Vi_n is changed from 22 V to 18 V, which is the target voltage value. As a result, the drop of the output terminal voltage VOUT become gradual, and undershoot is suppressed.

At a timing t14, the output terminal voltage VOUT becomes less than or equal to the goal voltage −1 kV. Thereby, the detected voltage Vsns and the negative reference voltage VN_REF (waveform A9) intersect. That is, Vsns VN_REF. At this time, the level of the chopping signal CHP output from the comparator IC9 is inverted from "H" to "L". Thereby, the combined clock signal NCLK output from the AND circuit IC14 is changed to the "L" level. The FET Q13 becomes unable to switch the negative transformer T11, and the absolute value of the output terminal voltage VOUT decreases.

At a timing t15, the detected voltage Vsns and the negative reference voltage VN_REF intersect again, and the relationship Vsns>VN_REF is satisfied. Since the level of the chopping signal CHP is inverted from "L" to "H" again, the negative clock signal CLKN is directly output as the combined clock signal NCLK. Thereby, the negative transformer T11 starts operating, and the absolute value of the output terminal voltage VOUT increases. Thus, as long as the operations of the comparator IC9 and the AND circuit IC14 continue, the output terminal voltage VOUT repeatedly rises and drops around 1 kV.

A timing t16 is a timing at which the negative bias has risen and is sufficiently stabilized. At the timing t16, the controller 300 switches the negative reference voltage VN_REF from 0.7 V to 0 V. Thereby, the relationship Vsns>VN_REF is satisfied, and the level of the chopping signal CHP is fixed at "H". Additionally, the negative clock signal CLKN is directly output as the combined clock signal NCLK, and the output terminal voltage VOUT is stably maintained at −1 kV, which is the goal voltage.

Another control method according to the present embodiment will be described with reference to FIG. 6. According to FIG. 6, at a timing t54, the controller 300 sets the reference voltage VN_REF to a first value (e.g., 1.0 V) that is higher than a second value. At a timing t55, the controller 300 switches the reference voltage VN_REF to the second value (e.g., 0.7 V). The second value is a voltage for setting the output terminal voltage VOUT to the final goal voltage (e.g., −1 kV). Thus, the reference voltage VN_REF may be changed in two steps. The timing for switching from the first value to the second value is when a predetermined time has elapsed after stopping CNTP. The predetermined time may be determined in advance at the time of shipment, or may be dynamically determined based on an environmental condition and the like, as will be described in Embodiment 2.

Figure 6:
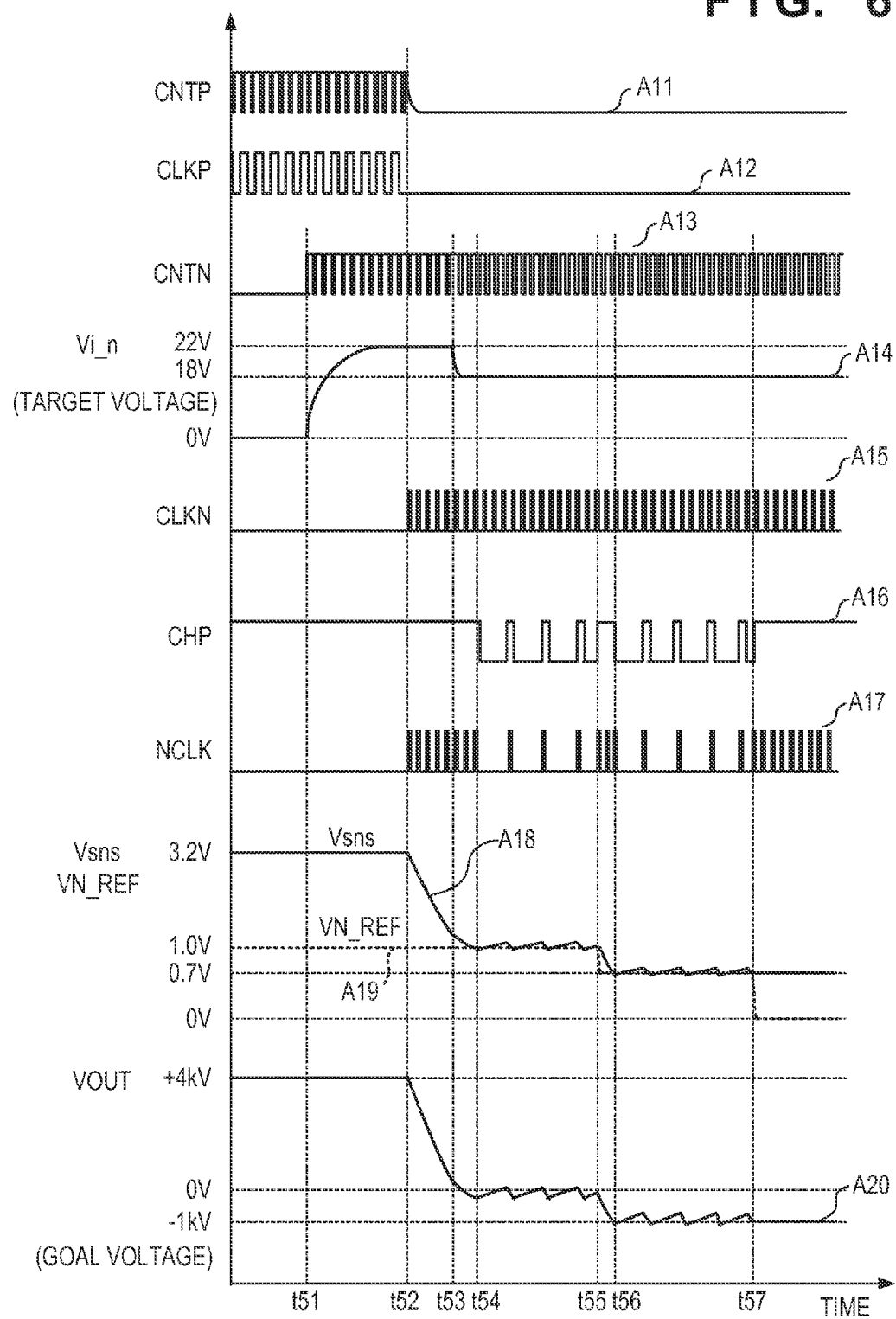
FIG. 6 is a graph showing waveforms of various types of signals or voltages.

Referring to FIG. 6, before the output terminal voltage VOUT reaches the goal voltage −1 kV, the detected voltage Vsns and the negative reference voltage VN_REF intersect, and the relationship Vsns≤VN_REF is satisfied. If it is determined that this relationship is satisfied, the comparison unit 9 starts a thinning-out control (t54). Thereby, the output terminal voltage VOUT (e.g., 0 V) is maintained. At the timing t55, the reference voltage VN_REF lowers, as a result of which the relationship Vsns>VN_REF is satisfied. Thereby, the level of the chopping signal CHP, which is an output of the comparator IC9, is inverted from "L" to "H" again. As a result, the negative clock signal CLKN is directly generated as the combined clock signal NCLK, and the negative transformer T11 starts operating. The absolute value of the output terminal voltage VOUT increases to the goal voltage −1 kV. At a timing t56, the voltage detection signal Vsns and the negative reference voltage VN_REF intersect again, and the relationship Vsns≤VN_REF is satisfied. Thereby, the level of the chopping signal CHP is inverted from "H" to "L" again, and the thinning-out control is resumed. At a timing t57, the thinning-out control ends, and the output terminal voltage VOUT is maintained at the goal voltage −1 kV. Thus, it is possible to adopt a control by which the reference voltage VN_REF is switched stepwise.

Summary of Embodiment 1

According to Embodiment 1, when the voltage supplied to the load 8 is switched from the voltage of the second polarity (e.g., the transfer voltage) to the voltage of the first polarity (e.g., the cleaning voltage), the capacitor C12 contributing to the voltage of the first polarity is charged in advance. Before the voltage supplied to the load 8 is switched from the DC voltage of the second polarity to the DC voltage of the first polarity, the calculation unit 301 starts charging the capacitor C12 that holds the voltage supplied to the primary side of the transformer of the first power supply unit. Referring to FIG. 4, before the positive bias circuit 202 is turned off in order to switch from the positive voltage output state to the negative bias output state, the primary side voltage Vi_n of the transformer T11 is set to the target voltage (22 V). Then, when the positive bias circuit 202 is turned off, the negative bias circuit 201 starts the switching operation. Thus, the primary side voltage is set to the target voltage before the positive bias circuit 202 is turned off, and therefore, the negative bias can be raised in a short time. The primary side voltage of the transformer T11 is made to gradually approach the target voltage (22 V->18 V) as the output terminal voltage VOUT drops. By changing the target voltage of the primary side voltage from the higher first voltage (e.g., 22 V) to the final second voltage (e.g., 18 V) (t13, t53), the change in the output terminal voltage VOUT becomes gradual, and undershoot is suppressed.

Furthermore, in Embodiment 1, the clock signal is thinned out in the period during which the voltage supplied to the load 8 transits from the positive bias to the negative bias. For example, when the detected voltage Vsns reaches the reference voltage VN_REF, the combining unit 16 starts thinning out the clock signal. That is, the combining unit 16 chops the clock signal CLKN to thin out the clock signal. As a result of the FET Q13 switching the transformer T11 in accordance with the thinned-out clock signal, the negative bias is maintained at the goal voltage (0 V, −1 kV). As shown in the combined clock signal NCLK (waveform A7) in FIG. 4, the cycle of NCLK in the period for outputting the positive bias is shorter than the cycle thereof in the period for transiting to the negative bias. In other words, the cycle of NCLK in the period for transiting to the negative bias is longer than the cycle of NCLK in the period for outputting the positive bias. This makes it possible to achieve a stable control for the output voltage. Note that the combining unit 16 may variably control the thinning-out amount of the clock signal. For example, the thinning-out amount may be gradually reduced. Note that the thinning-out amount may be instructed to the combining unit 16 by the calculation unit 301 of the controller 300.

Although the control for switching the target voltage Vc_n once has been described in the present embodiment, the target voltage Vc_n may be switched stepwise a plurality of times. This will increase the effect of suppressing undershoot. Further, the comparator IC9 and the AND circuit IC14 may be integrated into a single chip, or the CPU and the ASIC installed in the controller 300 may have the same functionality. In the present embodiment, a description has given of the control for thinning out the clock signal at the stage at which the negative bias has reached the goal voltage (0 V, −1 kV) after switching the polarity of the output terminal voltage VOUT from positive to negative. However, the clock signal may be thinned out in the process during which the negative bias reaches the goal voltage. In the present embodiment, the control for thinning out the negative clock signal CLKN is stopped at the timing after the polarity of the output terminal voltage VOUT is switched from positive to negative and at which the negative bias has stabilized (t16, t57). However, the control for thinning out the negative clock signal may be continued. Although a description has been given of the switching from the negative bias to the positive bias during the sheet interval in the present embodiment, the present embodiment is also applicable to a case where the switching between positive and negative is performed a plurality of times during the sheet interval or after the end of image formation. In the present embodiment, inverter transformers are used as the positive transformer T22 and the negative transformer T11. However, the same effect can also be achieved by using piezoelectric transformers.

As described with reference to FIG. 6, the calculation unit 301 may change the reference voltage VN_REF for determining the thinning-out timing in the process of switching from the positive bias to the negative bias one or more times. For example, the calculation unit 301 may switch the reference voltage VN_REF from a first value (e.g., 1.0 V) or a second value (e.g., 0.7 V) that is smaller than the first value. Thereby, the output terminal voltage VOUT gradually approaches the goal voltage (e.g., −1 kV) of the negative bias, and therefore, undershoot does not easily occur.

Embodiment 2

Figure 7:
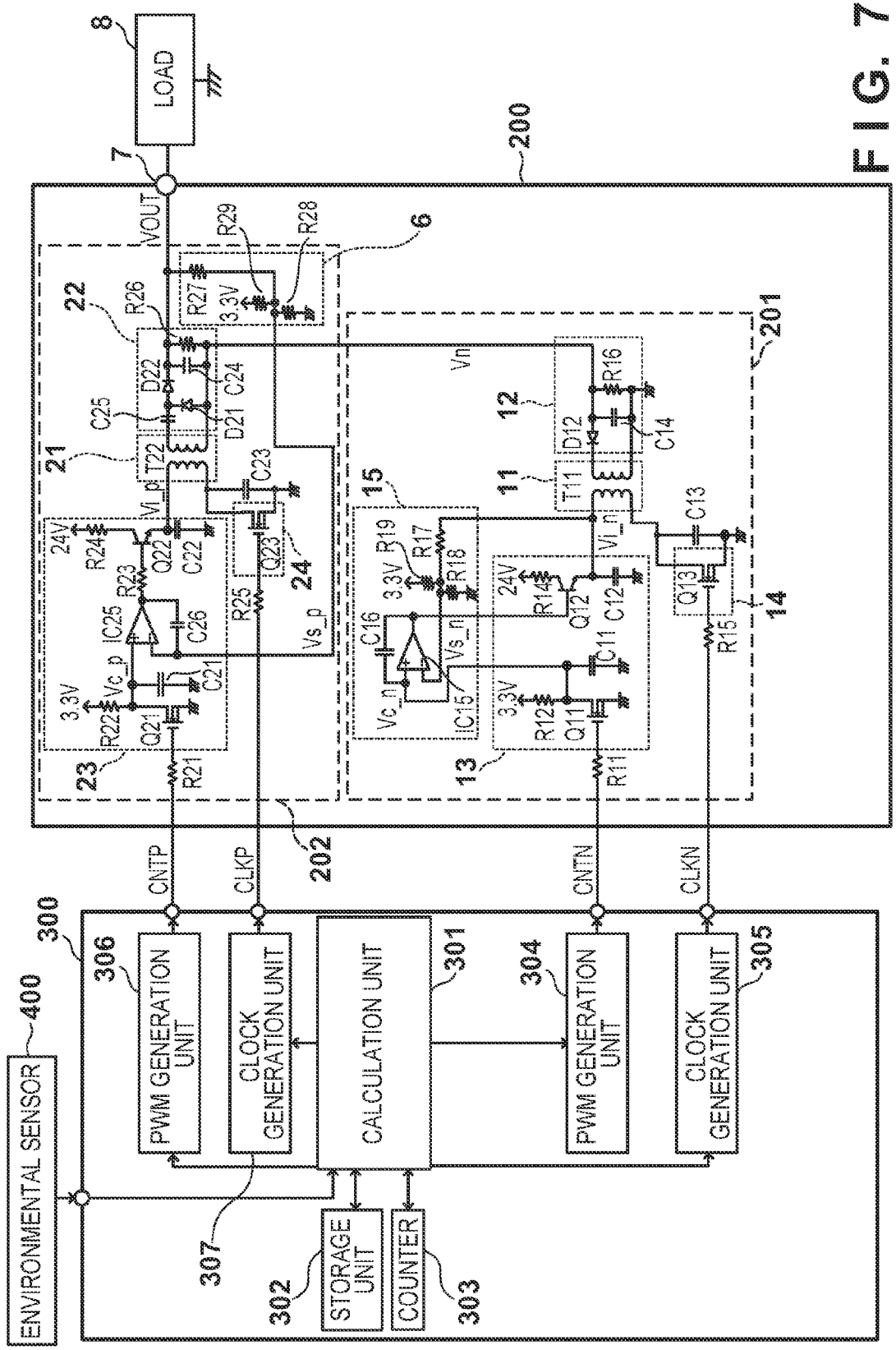
FIG. 7 is a circuit diagram of the voltage generating apparatus.

An example of the circuitry of a high-voltage power supply 200 according to Embodiment 2 will be described with reference to FIG. 7. FIG. 7 is different from FIGS. 1 and 2 in that the combining unit 16 and the comparison unit 9 are omitted, whereas an environmental sensor 400 is added. Since the combining unit 16 and the comparison unit 9 are omitted, the negative clock signal CLKN generated by the clock generation unit 305 is directly input to the gate of the FET Q13 via the resistor R15. Accordingly, the thinning-out control for the clock signal CLKN is performed by the controller 300.

Description of Characterizing Portion of the Present Embodiment

In Embodiment 1, the output detected voltage Vsns and the reference voltage VN_REF are compared to determine the start timing of the thinning-out control. That is, the timing at which the output detected voltage Vsns first falls below the reference voltage VN_REF is the start timing of the thinning-out control. On the other hand, in Embodiment 2, the start timing of the thinning-out control is determined in accordance with an environmental condition (environmental state) such as the temperature or humidity of the atmosphere, or a durability condition. For example, the output set voltage Vc_p of the positive bias is variably controlled in accordance with the environmental condition such as temperature or humidity, or a durability condition. When the output set voltage Vc_p is changed, a time tp required for the output voltage to reach the negative goal voltage also changes. Therefore, in Embodiment 2, the relationship between the environmental condition and the time tp may be represented in advance in the form of a formula or table at the time of shipment or the like, and the formula or the table is stored in the storage unit 302 of the controller 300. Note that the time of commencement of the time tp is, for example, the output start timing of the negative control signal CNTN. The time of expiration of the time tp is, for example, the start timing of the thinning-out control. Note that the timing at which the duty ratio of the negative control signal CNTN is changed is also determined in the same manner as with the start timing of the thinning-out control.

In the following description, the calculation unit 301 determines the time tp by using the detection information from the environmental sensor 400. However, the durability information (e.g., the accumulated operating time or the accumulated number of images formed) about the image forming apparatus 110 that is accumulated in the storage unit 302 may be used. These pieces of information are used not only to determine the time tp, but also to determine Vc_p. It is assumed that the relationship between these pieces of information and Vc_p is also represented in advance in the form of a formula or table at the time of shipment or the like, and stored in the storage unit 302.

Description of Circuitry and Operation of the Present Embodiment

Figure 8:
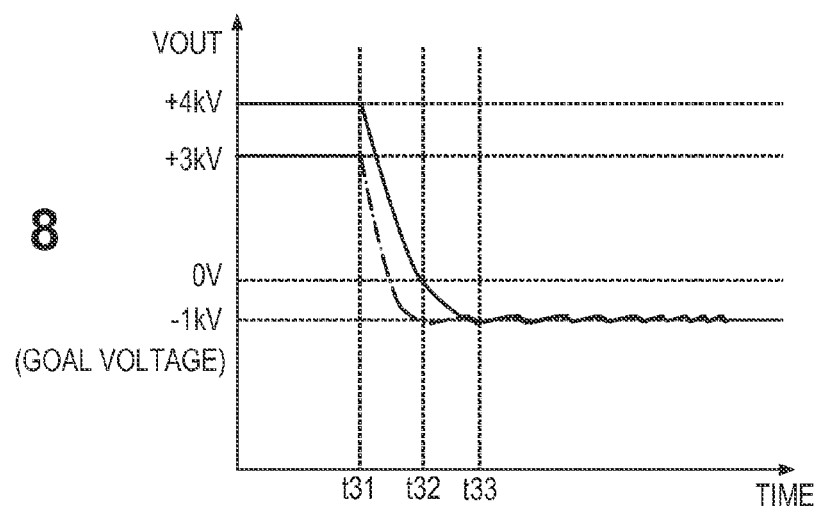
FIG. 8 is a graph showing the relationship between an output terminal voltage (positive bias) and the control time.

As shown in FIG. 8, the control time (dropping time) from the timing at which the switching is started until the timing at which the goal value of the negative output voltage is reached changes depending on the magnitude of the positive output voltage value. For example, comparing the control time required to switch the output terminal voltage VOUT from +4 kV to −1 kV and the control time required to switch the output terminal voltage VOUT from +3 kV to −1 kV, the former is longer. Accordingly, if the usage environment of the image forming apparatus is known and the usage environment is in a stable state, it is possible to predict the control time required for switching from positive to negative.

Figure 9:
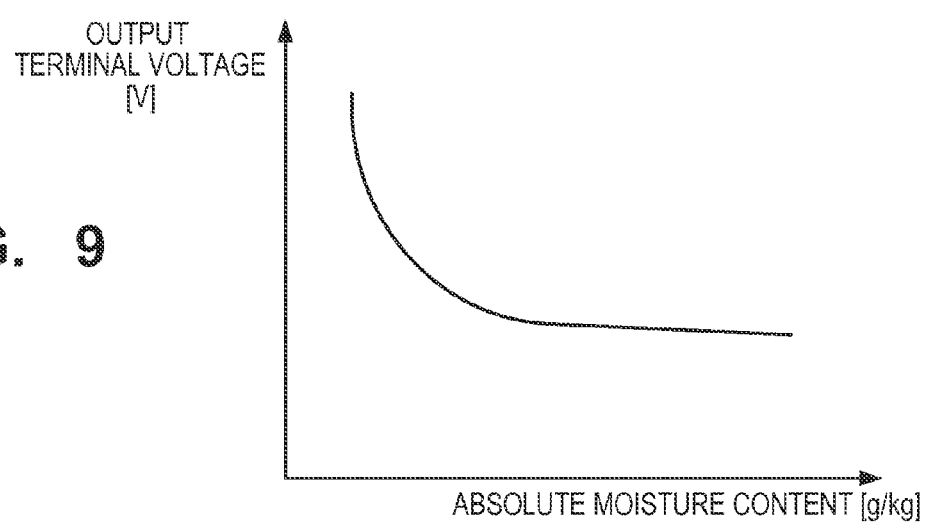
FIG. 9 is a graph showing the relationship between an output terminal voltage and the absolute moisture content of an atmosphere.

As shown in FIG. 9, if the relationship of the output terminal voltage VOUT with respective to the absolute moisture content is known in advance, it is possible to predict the control time require to switch the output terminal voltage VOUT from positive to negative. More specifically, the absolute moisture content is measured by the environmental sensor 400, the output terminal voltage VOUT is determined from the absolute moisture content, and the control time tp is determined from the output terminal voltage VOUT. Note that the output terminal voltage VOUT is determined based on the positive control signal CNTP.

Figure 10:
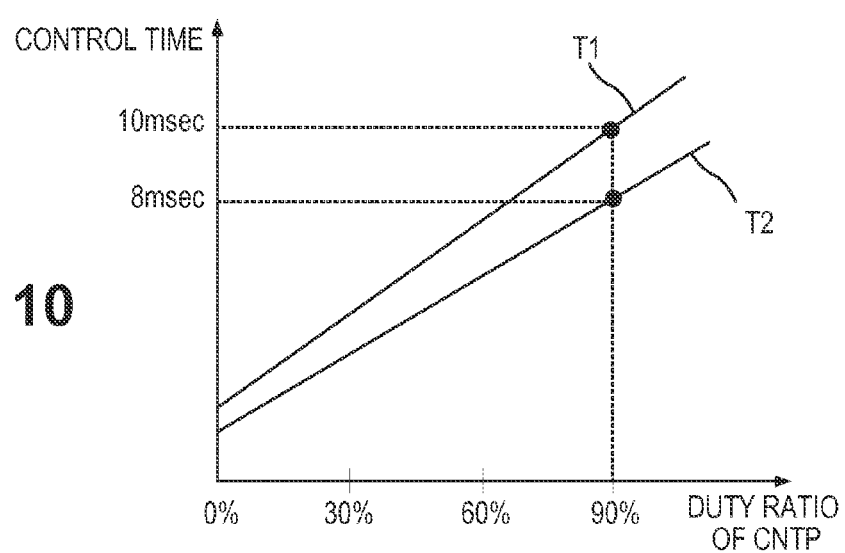
FIG. 10 is a graph showing the relationship between the duty ratio of a positive control signal and the control time.

As shown in FIG. 10, the relationship between the duty ratio of the positive control signal CNTP and the control time is indicated in the storage unit 302. "T1" denotes the control time required from when the output of the positive control signal CNTP is stopped until the output terminal voltage VOUT reaches the negative goal voltage. "T2" denotes the control time required from when the output of the negative clock signal CLKN is started until the timing at which the duty ratio of the negative control signal CNTN is switched. The storage unit 302 stores formulas or tables representing T1 and T2. For example, when the duty ratio of the positive control signal CNTP is 90%, the controller 300 switches the duty ratio of the negative control signal CNTN after 8 msec from the start of the output of the negative clock signal CLKN. The output terminal voltage VOUT reaches −1 kV, which is the goal voltage, after 10 msec from the start of the output of the negative clock signal CLKN.

A specific operation of the present embodiment will be described with reference to FIG. 11. As the initial state, the positive control signal CNTP (waveform B1) is input to the voltage supply unit 23 at a frequency of 13 kHz, a duty ratio of 80%, and an amplitude of 3.3 V, for example. Additionally, the positive clock signal CLKP (waveform B2) is input to the switch unit 24 at a frequency of 50 kHz, a duty ratio of 50%, and amplitude of 3.3 V, and a predetermined frequency, for example. Thereby, the output terminal voltage VOUT (waveform B6) is maintained at a positive output voltage of +4 kV.

At a timing t21, the calculation unit 301 controls the PWM generation unit 304 to start outputting the control signal CNTN at a frequency of 13 kHz, a duty ratio of 90%, and an amplitude of 3.3 V (waveform B3). At this time, the calculation unit 301 reads the numerical value of the counter 303, and starts counting up. It is assumed that the timing t21 is determined in advance so as to be prior by a predetermined time to a timing t22 at which the secondary transfer ends.

The calculation unit 301 determines the control time corresponding to the environmental condition (e.g., absolute moisture content) acquired by the environmental sensor 400 by referencing the formula or table stored in the storage unit 302. Thereby, the timing at which the duty ratio of the negative control signal CNTN is switched is determined to be the timing at which, for example, 6 msec has elapsed from the start of the output of the negative clock signal CLKN. Likewise, the timing at which the thinning out of the negative clock signal CLKN is started is determined to be the timing at which, for example, 8 msec has elapsed from the start of the output of the negative clock signal CLKN.

At the timing t22, the calculation unit 301 stops the output of the positive control signal CNTP and the positive clock signal CLKP. Additionally, the calculation unit 301 controls the clock generation unit 305 to start outputting the negative clock signal CLKN at a frequency of 50 kHz, a duty ratio of 50%, and an amplitude of 3.3 V (waveform B5). At this time, the duty ratio of the negative control signal CNTN is set to 90%. Accordingly, at a timing t23 at which the counter 303 has counted to 6 msec, the calculation unit 301 switches the duty ratio of the negative control signal CNTN from 90% to 70%. Thereby, the negative primary side voltage Vi_n is switched from 22 V to 18 V, which is the target voltage. It is assumed that the counter 303 starts counting at the timing t21.

Figure 11:
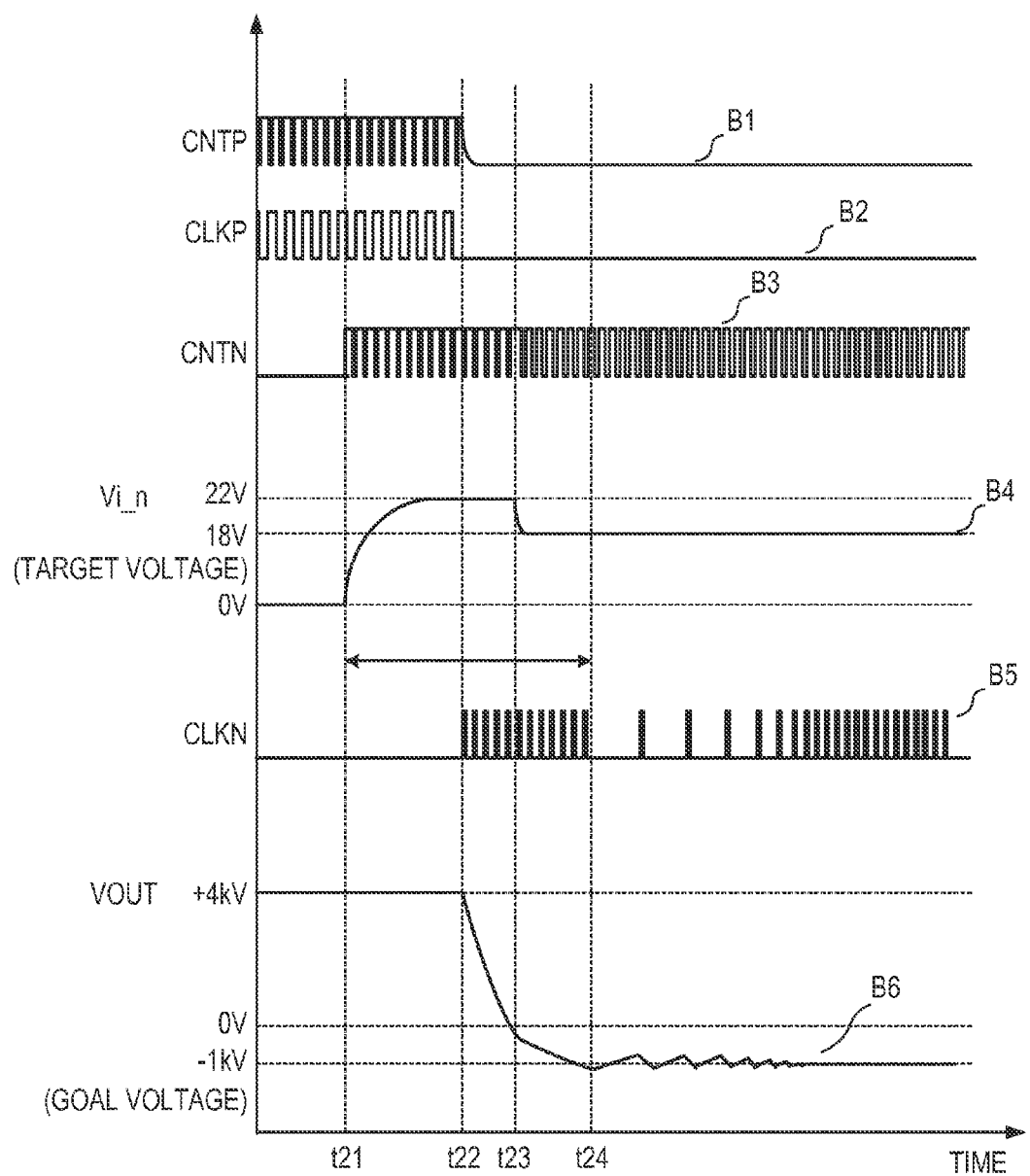
FIG. 11 is a graph showing waveforms of various types of signals or voltages.

At a timing t24, the count value of the counter 303 is 10 msec (the period indicated by the arrow in FIG. 11). When the calculation unit 301 recognizes that the count value has become 10 msec, it starts the thinning out of the negative clock signal CLKN. For example, the duty ratio of the negative clock signal CLKN is changed from 25% to 0%. Thereby, the drop of the output terminal voltage VOUT temporarily stops at around −1 kV, which is the goal value, but is not yet in the stable output state. Accordingly, at and after the timing t24, the calculation unit 301 controls the clock generation unit 305 to gradually restore the duty ratio of the negative clock signal CLKN from 0% to 25%. With regards to this restoration sequence for the duty ratio of the negative clock signal CLKN as well, a plurality of restoration sequences may be stored in advance in the storage unit 302 in accordance with the output voltage value of the positive bias. The calculation unit 301 may read out a restoration sequence most suitable for the environmental condition or the output voltage value of the positive bias from the storage unit 302 and execute the restoration sequence. This will enable a highly accurate control for the negative bias.

As described above, according to Embodiment 2, the calculation unit 301 determines the thinning-out timing in accordance with the environmental condition (the absolute moisture content of the atmosphere) and the like. The calculation unit 301 may determine the timing at which the thinning out of the clock signal is started, for example, in accordance with the set value of the positive bias or the negative bias that is determined based on the environmental condition. The calculation unit 301 may determine the thinning-out start timing by using a table or formula stored in the storage unit 302, and manage the timing by using the counter 303. That is, the storage unit 302 and the counter 303 that are provided in the controller 300 are used, and therefore, there is an advantage that additional circuits such as the comparator IC9 and the AND circuit IC14 are unnecessary. Accordingly, the circuitry can be configured inexpensively and easily. The other effects relating to Embodiment 2 are the same as the effects of Embodiment 1. Note that in Embodiment 2, the calculation unit 301 may variably control the thinning-out amount of the clock signal by controlling the clock generation unit 305. For example, the thinning-out amount may be gradually reduced.

Others

In Embodiment 2, it is assumed that the goal value of the positive output voltage is variable and the goal value of the negative output voltage is fixed. However, the goal value of the positive output voltage may be fixed, and the goal value of the negative output voltage may be variable depending on the environmental condition. In this case, a formula or function representing the relationship between the environmental condition or the goal value of the negative output voltage and the control time will be stored in the storage unit 302. The goal values of both the positive and negative output voltages may be variable. In this case, a formula or function representing the relationship between the environmental condition and the control time will be stored in the storage unit 302. Alternatively, a formula or function representing the relationship between the difference between the goal value of the positive output voltage and the goal value of the negative output voltage, and the control time may be stored in the storage unit 302. Thus, the control time will be directly or indirectly determined from the environmental condition.

The calculation unit 301 may determine the timing at which the count up of the counter 303 is started to be the timing t22. This is because the time from the start of the output of the control signal CNTN to the stop of the output of the control signal CNTP is constant.

Figure 12:
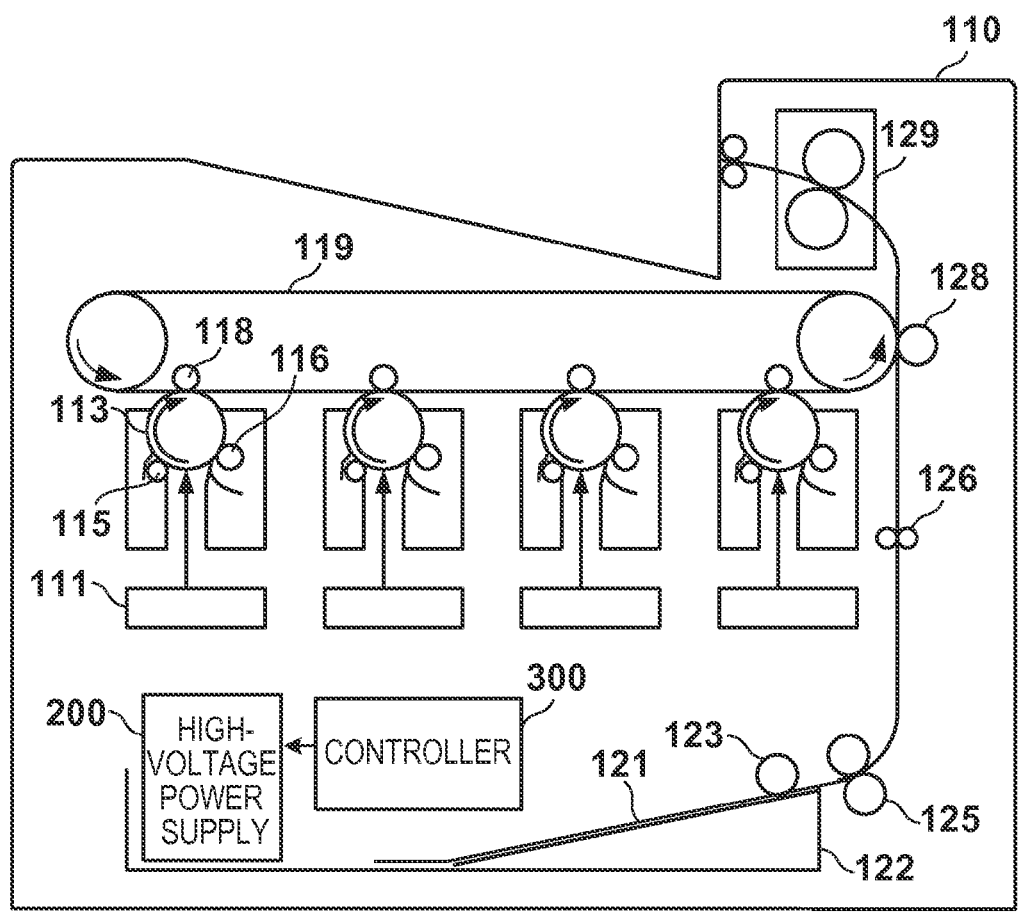
FIG. 12 is a diagram showing an example of the image forming apparatus.

The voltage generating apparatus 100 described above can be used for a variety of electronic apparatuses, and is applicable to a power supply for an electrophotographic image forming apparatus, for example. FIG. 12 is a diagram showing an example of an electrophotographic, multi-color image forming apparatus. The multi-color image forming apparatus 110 is a tandem color laser beam printer, and outputs a multi-color image by overlapping toners of four colors of yellow (Y), magenta (M), cyan (C), and black (K).

A photosensitive member 113 rotates in the direction of the arrow in FIG. 12, and is charged at a uniform voltage by a charging roller 116 to which a charging voltage is applied from the high-voltage power supply 200. An electrostatic latent image is formed on the surface of the photosensitive member 113 by an exposure device 111. A developing roller 115, to which a developing voltage is applied from the high-voltage power supply 200, develops the electrostatic latent image. The developing roller 115 is an example of a developing unit configured to develop the electrostatic latent image into a toner image. Additionally, the high-voltage power supply 200 functions as an application unit configured to apply the developing voltage to the developing roller 115. A primary transfer voltage is applied to a primary transfer roller 118 from the high-voltage power supply 200. Thereby, the toner image is primary transferred to an intermediate transfer member 119 from the photosensitive member 113. A toner image of four colors of yellow (Y), magenta (M), cyan (C), and black (K) is transferred to the intermediate transfer member 119 while being overlapped. The intermediate transfer member 119 functions as an image carrier.

A recording sheet 121 stored in the cassette 122 is sent out to a conveyance path by a sheet feed roller 123. The recording sheet 121 is transported to a secondary transfer nip portion by a conveyance roller pair 125 and a registration roller pair 126. A secondary transfer voltage (positive bias) is applied from the high-voltage power supply 200 to a secondary transfer roller 128 installed at the secondary transfer nip portion. The toner image is transferred from the intermediate transfer member 119 onto the recording sheet 121 by the secondary transfer roller 128. The secondary transfer roller 128 functions as a transfer unit configured to transfer the toner image from the image carrier to the sheet. Additionally, the voltage generating apparatus 100 functions as an application unit configured to apply the transfer voltage or the cleaning voltage to the secondary transfer roller 128. As described with reference to FIG. 3, the voltage generating apparatus 100 applies the cleaning voltage to the secondary transfer roller 128 during the period after the trailing end of the preceding sheet passes through the secondary transfer roller 128 and the leading end of the subsequent sheet arrives at the secondary transfer roller 128. The toner image is heat-fixed onto the recording sheet 121 by a fixing device 129.

By adopting the above-described voltage generating apparatus 100 for the image forming apparatus 110, it is possible to shorten the FPOT of the image forming apparatus 110. "FPOT" is an abbreviation of first print out time, and means the waiting time required to output the first image after starting up the image forming apparatus 110. That is, the image forming apparatus 110 of the present embodiment can shorten FPOT as compared with other image forming apparatuses that perform cleaning of the secondary transfer roller 128 before starting the formation of the first image. This is because the image forming apparatus 110 of the present embodiment performs the cleaning of the secondary transfer roller 128 during the sheet interval time or after the formation of an image.

Embodiment 3

Embodiment 3 is an improvement of Embodiment 1, and is characterized particularly in that the primary side voltage of the transformer is corrected in accordance with the potential difference between the positive bias and the negative bias. Needless to say, the primary side voltage of the transformer may be corrected in accordance with the magnitude of the load 8, or may be corrected in accordance with a combination of the potential difference and the magnitude of the load 8. This makes it possible to switch from the positive bias to the negative bias or from the negative bias to the positive bias at high speed, while suppressing overshoot and undershoot. While the present invention can also be applied to the switching from the negative bias to the positive bias in this way, a description will be given here, focusing on the switching from the positive bias to the negative bias.

Figure 13:
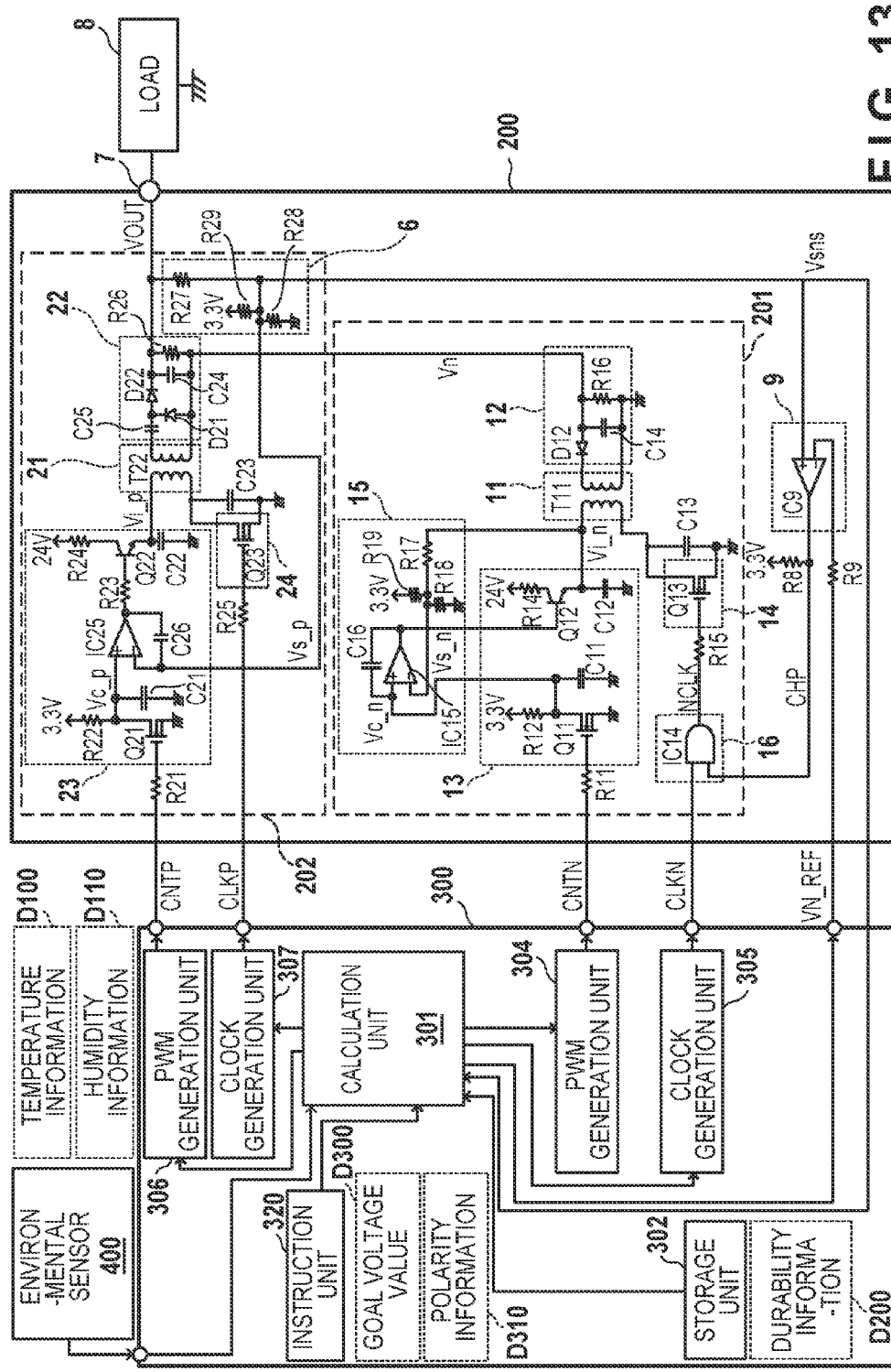
FIG. 13 is a circuit diagram of the voltage generating apparatus.

Embodiment 3 will now be described with reference to FIG. 13. Note that components that have been already described are denoted by the same reference numerals so as to simplify the description. A controller 300 includes a calculation unit 301 that calculates the amount of control by a high-voltage power supply 200. An instruction unit 320 provides a goal voltage value D300 and polarity information D310 to the calculation unit 301. A storage unit 302 stores durability information D200 such as the number of image formed and the operating time. Furthermore, the environmental sensor 400 measures the ambient temperature of the image forming apparatus 110 to generate temperature information D100 or measures the ambient humidity to generate humidity information D110, and passes these pieces of information to the controller 300. The calculation unit 301 inputs a voltage detection signal Vsns, and recognizes the output terminal voltage VOUT.

With reference to FIG. 14, a description will be first given of one of the characteristics of Embodiment 3, namely, a method for determining the initial value of the voltage (primary side voltage $Vi\_n$) of the capacitor C12 that is charged in advance during the positive bias output. Note that a negative bias Vn is output from the output terminal voltage VOUT. It is assumed that the load 8 (the resistance value of the secondary transfer roller 128) is in a constant state and the switching waveform CLKN of the negative bias is constant. As shown in Table 1, the negative bias Vn has a voltage value corresponding to the primary side voltage $Vi\_n$. Thus, the correspondence between the negative bias Vn and the primary side voltage $Vi\_n$ is held in Table 1, and Table 1 is stored in the storage unit 302. The calculation unit 301 determines the primary side voltage $Vi\_n$ from the output terminal voltage VOUT specified by the instruction unit 320 and Table 1, and sets the primary side voltage $Vi\_n$ in the PWM generation unit 304. For example, when the output terminal voltage VOUT is set to −1 kV, the calculation unit 301 sets the primary side voltage $Vi\_n$ to +6.67 V by referencing Table 1. In Embodiment 3, the calculation unit 301 also references Table 2 in order to correct the initial value of the primary side voltage $Vi\_n$. Table 2 shows the voltage values (correction voltages) that are added to the primary side voltage $Vi\_n$ determined from Table 1. As shown in Table 2, in Embodiment 3, the calculation unit 301 variably controls the primary side voltage $Vi\_n$ depending on "the potential difference between the positive bias and the negative bias" and "the magnitude of the load". For example, if "the potential difference between the positive bias and the negative bias is a medium level" and "the load is a large level", then the correction voltage is +7 V. More specifically, if the negative bias Vn is −1 kV and the positive bias Vp is 1 kV, the calculation unit 301 determines that the potential difference (absolute value) is a medium level. Also, the calculation unit 301 determines the level of the load 8 from the environmental information (the temperature information D100 and the humidity information D110) and the durability information (the number of images formed and the operating time). Furthermore, the calculation unit 301 determines the correction voltage corresponding to the potential difference level and the load level by referencing Table 2. For example, if the negative bias Vn is −1 kV, the primary side voltage $Vi\_n$ after correction will be 6.67 V+7 V=13.67 V.

While a case has been described thus far where the switching is performed from the positive bias to the negative bias, the controller 300 performs the same operation also in a case where the switching is performed from the negative bias to the positive bias. Specifically, the relationship between the primary side voltage $Vi\_p$ of the positive bias circuit 202 and the output terminal voltage VOUT is stored in the storage unit 302 in the form of Table 3. As shown in FIG. 14, the content of Table 3 in the positive bias circuit 202 may be equivalent to the content of Table 1 in the negative bias circuit 201 except for the polarity. Additionally, the correction voltage of the primary side voltage $Vi\_p$ is also determined from Table 2, depending on "the potential difference between the positive bias and the negative bias" and "the magnitude of the load". Note that in place of Table 2, Table 4 may be stored in the storage unit 302 separately for the primary side voltage $Vi\_p$. Here, Table 2 is commonly used for the positive bias and the negative bias.

Figure 15A:
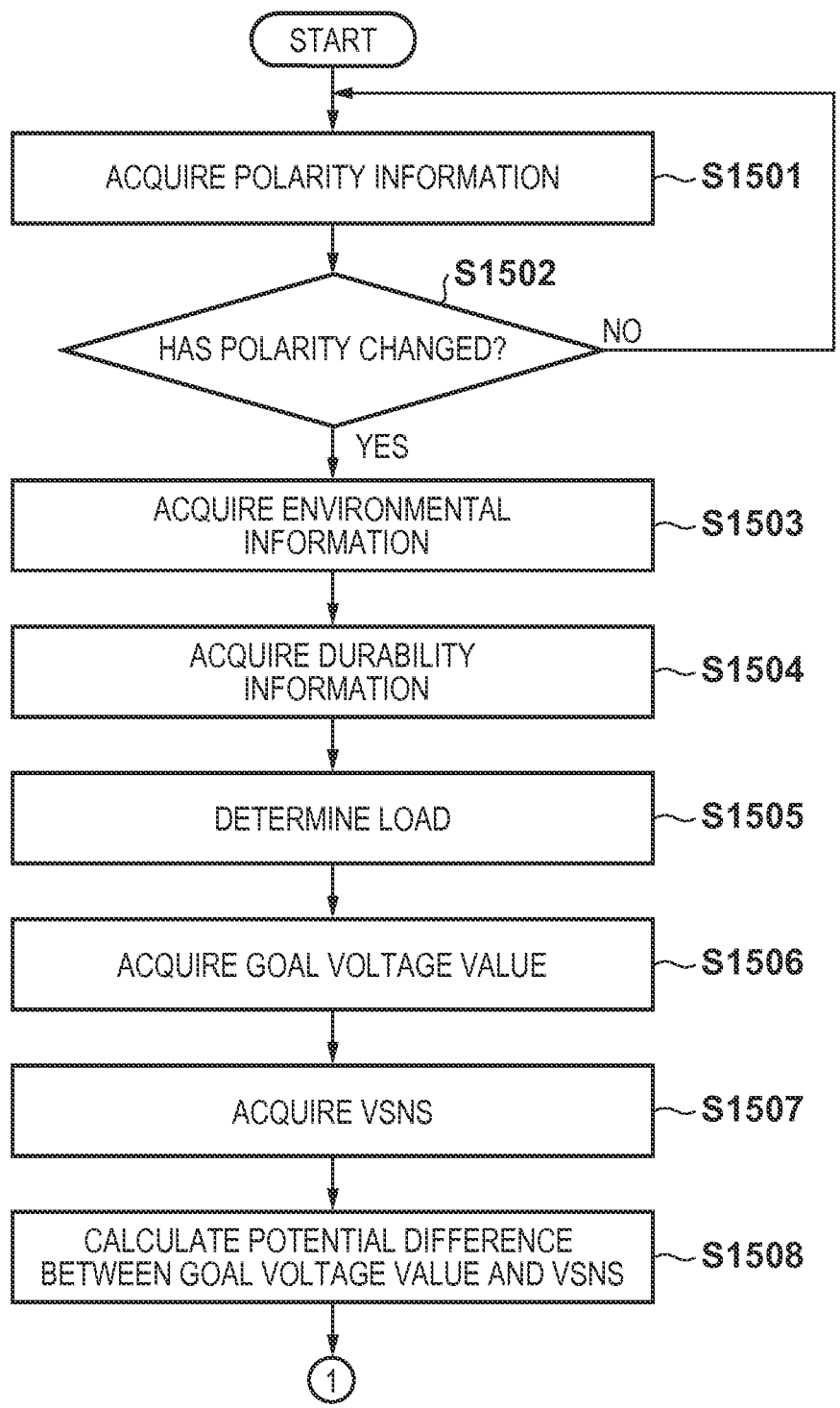
FIGS. 15A and 15B are flowcharts illustrating a method for controlling a primary side voltage.
Figure 15B:
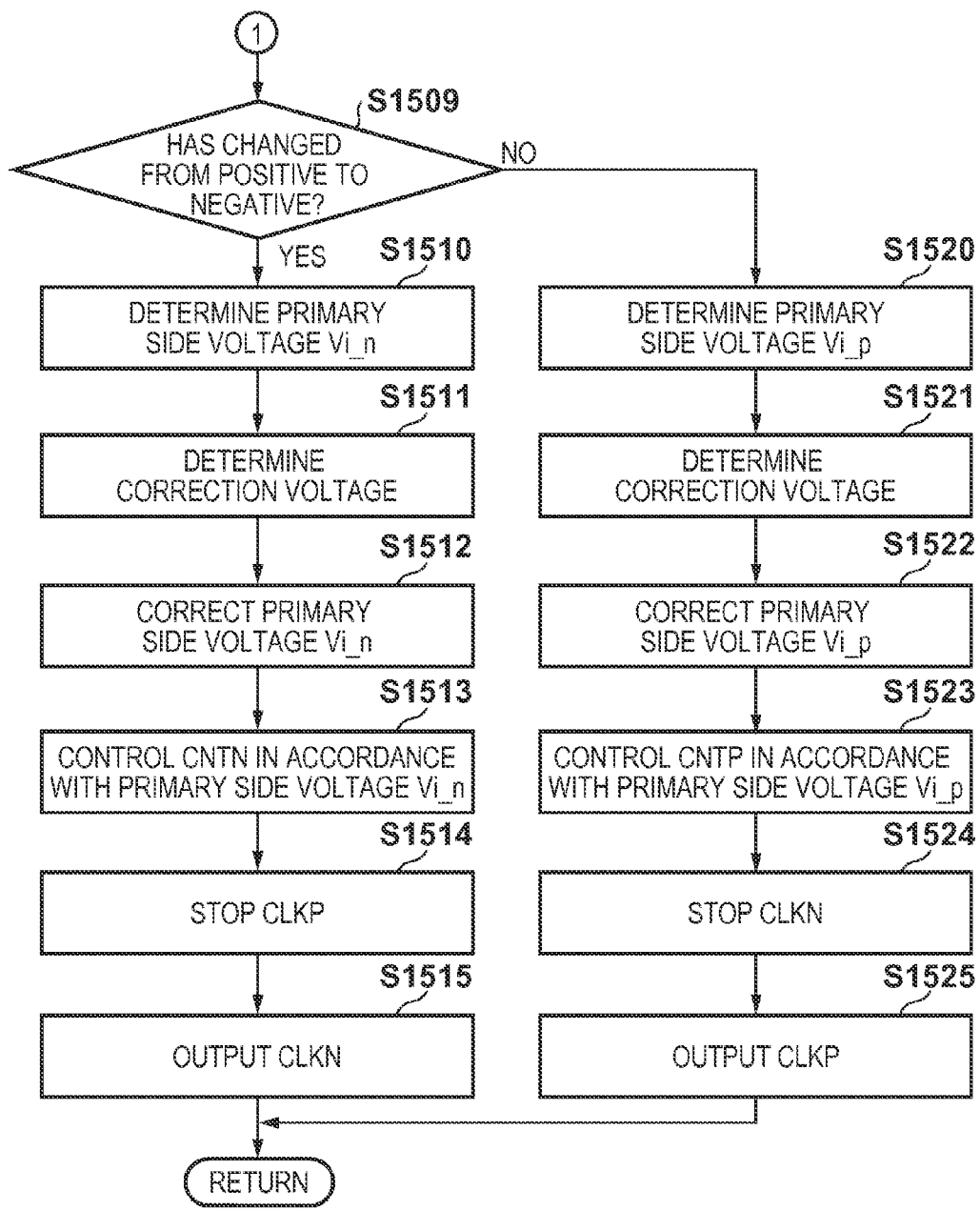

FIGS. 15A and 15B show an operation performed by the calculation unit 301 of the controller 300. Here, a state is assumed in which the positive bias or the negative bias is stably output. At S1501, the calculation unit 301 acquires the polarity information D310 sent from the instruction unit 320. At S1502, the calculation unit 301 determines whether the polarity has changed by comparing the present polarity and the polarity indicated by the polarity information D310. If the polarity has changed, the process proceeds to S1503.

At S1503, the calculation unit 301 acquires the environmental information (temperature information D100, humidity information D110) from the environmental sensor 400. The environmental sensor 400 is an example of a detection unit configured to detect the environmental state of a load. At S1504, the calculation unit 301 acquires the durability information D200 (the number of images formed, the operating time, etc.) from the storage unit 302. At S1505, the calculation unit 301 determines the magnitude of the load 8 (resistance value) based on the acquired environmental information and durability information D200. The reason that the resistance value of the load 8 fluctuates is because the resistance value of the secondary transfer roller 128 that is dependent on the environmental state (temperature and humidity) and the durability state (the number of images formed and the operating time) fluctuates. For example, a rise in the environmental temperature results in an increase in the resistance value of the load 8, and a fall in the environmental temperature results in a decrease in the resistance value of the load 8. Additionally, a rise in the environmental humidity results in a decrease in the resistance value of the load 8, and a fall in the environmental humidity results in an increase in the resistance value of the load 8. Furthermore, as the duration of the load 8 advances, the resistance value of the load 8 increases. For example, when R is the resistance value of the load 8, this can be represented as $R = c_1 \cdot T + c_2 \cdot H + c_3 \cdot N$. $c_1$, $c_2$, and $c_3$ are coefficients determined by the material and the like of the secondary transfer roller 128 serving as the load 8. T is the environmental temperature. H is the environmental humidity. N is the number of images formed, which has been counted since the secondary transfer roller 128 was new. N is reset to zero when the secondary transfer roller 128 is replaced by a new one. Note that the arithmetic expression of R is merely an example. For example, it is sufficient that one of a combination of the environmental temperature, the environmental humidity, and the durability state of the load 8 is used. That is, either $R = c_1 \cdot T$, $R = c_2 \cdot H$, or $R = c_3 \cdot N$. Furthermore, either $R = c_1 \cdot T + c_2 \cdot H$, $R = c_1 \cdot T + c_3 \cdot N$, or $R = c_2 \cdot H + c_3 \cdot N$. Thus, the calculation unit 301 functions as a load determination unit configured to determine the magnitude of the load 8 based on the environmental state detected by the environmental sensor 400. Also, the calculation unit 301 may function as a load determination unit configured to determine the magnitude of the load based on the durability state of the load 8. Furthermore, the calculation unit 301 may be a load determination unit configured to determine the magnitude of the load 8 based on the environmental state detected by the environmental sensor 400 and the durability state of the load 8.

At S1506, the calculation unit 301 acquires the goal voltage value D300 provided by the instruction unit 320. At S1507, the calculation unit 301 acquires the voltage detection signal Vsns, and calculates the output terminal voltage VOUT. Since the voltage value indicated by the voltage detection signal Vsns and the output terminal voltage VOUT are linearly proportional, the output terminal voltage VOUT can be calculated by a simple calculation. At S1508, the calculation unit 301 calculates the potential difference between the goal voltage value D300 (positive bias/negative bias) and the output terminal voltage VOUT (negative bias/positive bias). At S1509, the calculation unit 301 determines whether the polarity has changed "from positive to negative" by comparing the present polarity and the polarity indicated by the polarity information D310. If the polarity has changed "from positive to negative", the process proceeds to S1510.

At S1510, the calculation unit 301 determines the primary side voltage Vi_n corresponding to the goal voltage value of the output terminal voltage VOUT by referencing Table 1. Thus, the calculation unit 301 functions as a voltage determination unit configured to determine the primary side voltage, which is the voltage supplied to the primary side of the transformer of the first power supply unit, in accordance with the goal value of the DC voltage of the first polarity when the voltage supplied to the load 8 is switched from the DC voltage of the second polarity to the DC voltage of the first polarity. Here, the DC voltage of the second polarity is the positive bias, and the DC voltage of the first polarity corresponds to the negative bias.

At S1511, the calculation unit 301 determines the correction voltage corresponding to the combination of the magnitude of the load 8 and the potential difference by referencing Table 2. Thus, the calculation unit 301 functions as a correction value determination unit configured to determine the correction value of the primary side voltage in accordance with at least the potential difference between the DC voltage of the second polarity and the DC voltage of the first polarity. Also, the calculation unit 301 may determine the correction value of the primary side voltage in accordance with a combination of the potential difference between the DC voltage of the second polarity and the DC voltage of the first polarity and the magnitude of the load 8. Additionally, the calculation unit 301 functions as a storage unit configured to store information indicating at least the correspondence between the potential difference and the correction value. As described above, the calculation unit 301 may determine the correction value corresponding at least to the potential difference by referencing Table 2 stored in the storage unit 302. In particular, Table 2 is an example of the information indicating the correspondence between the combination of the magnitude of the load 8 and the potential difference, and the correction value of the primary side voltage. In this case, the calculation unit 301 determines the correction value corresponding to the combination by referencing Table 2.

At S1512, the calculation unit 301 corrects the primary side voltage Vi_n by adding the correction voltage to the primary side voltage Vi_n. At S1513, the calculation unit 301 sets the corrected primary side voltage Vi_n (or the voltage Vc_n corresponding thereto) in the PWM generation unit 304 to generate CNTN corresponding to the corrected primary side voltage Vi_n. Thereby, before the polarity is switched, the capacitor C12 is charged such that the voltage across the capacitor C12 becomes equal to the primary side voltage Vi_n. At S1514, the calculation unit 301 controls the clock generation unit 307 to stop the output of CLKP. At S1515, the calculation unit 301 controls the clock generation unit 305 to start the output of CLKN. Thus, the positive bias is switched to the negative bias. In this way, here, the negative bias circuit 201, which functions as the first power supply unit, applies the primary side voltage corrected by the above-described correction to the primary side of the transformer T11 to generate a negative bias that is the DC voltage of the first polarity.

At S1509, if the calculation unit 301 determines that the polarity has changed "from negative to positive", the process proceeds to S1520. At S1520, the calculation unit 301 determines the primary side voltage Vi_p corresponding to the goal voltage value of the output terminal voltage VOUT by referencing Table 3. Thus, the calculation unit 301 functions as a voltage determination unit configured to determine the primary side voltage, which is the voltage supplied to the primary side of the transformer of the first power supply unit, in accordance with the goal value of the DC voltage of the first polarity when the voltage supplied to the load 8 is switched from the DC voltage of the second polarity to the DC voltage of the first polarity. Here, the DC voltage of the second polarity is the negative bias, and the DC voltage of the first polarity corresponds to the positive bias.

At S1521, the calculation unit 301 determines the correction voltage corresponding to the combination of the magnitude of the load 8 and the potential difference by referencing Table 2. Thus the calculation unit 301 functions as a correction value determination unit configured to determine the correction value of the primary side voltage in accordance with at least the potential difference between the DC voltage of the second polarity and the DC voltage of the first polarity.

At S1522, the calculation unit 301 corrects the primary side voltage Vi_p by adding the correction voltage to the primary side voltage Vi_p. At S1523, the calculation unit 301 sets the corrected primary side voltage Vi_p in the PWM generation unit 306 to generate CNTP corresponding to the corrected primary side voltage Vi_p. Thereby, before the polarity is switched, the capacitor C22 is charged such that the voltage across the capacitor C22 becomes equal to the primary side voltage Vi_p. At S1524, the calculation unit 301 controls the clock generation unit 305 to stop the output of CLKN. At S1525, the calculation unit 301 controls the clock generation unit 307 to start the output of CLKP. Thus, the negative bias is switched to the positive bias. In this way, here, the positive bias circuit 202, which functions as the first power supply unit, applies the primary side voltage corrected by the above-described correction to the primary side of the transformer T22 to generate a positive bias that is the DC voltage of the first polarity.

Description of Effects of Embodiment 3

Figure 16:
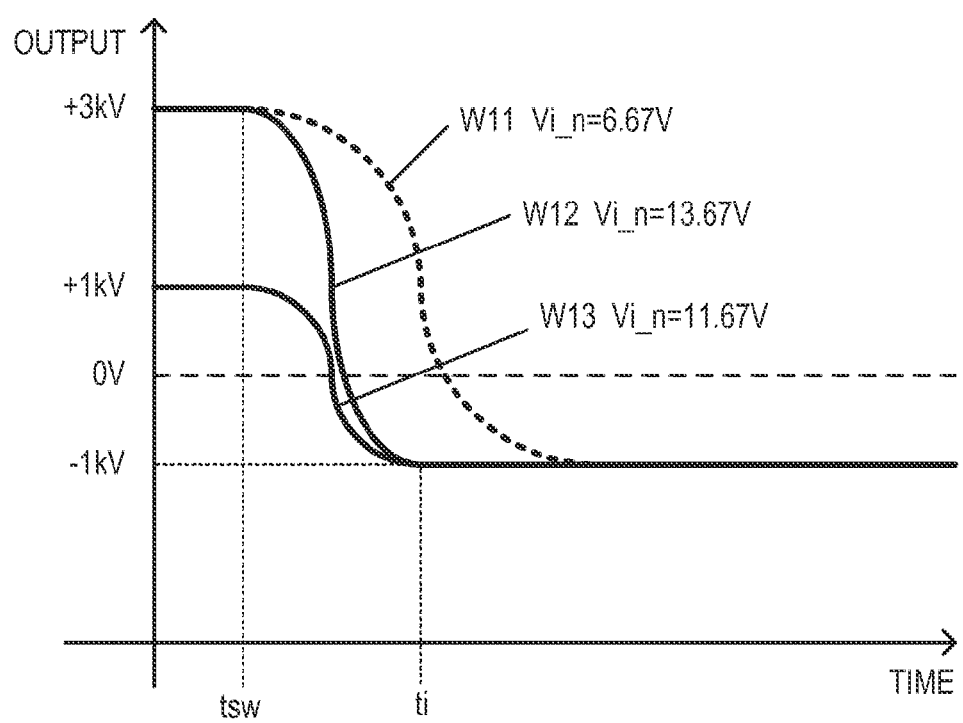
FIG. 16 is a graph showing an effect of an embodiment.

Here, effects of Embodiment 3 will be described with reference to FIG. 16. The horizontal axis represents the time, and the vertical axis represents the output terminal voltage VOUT. tsw is the switching timing from the negative bias to the positive bias. ti is the desired switching completion timing. Note that the values used in the following description, such as voltage values, are merely examples, and they may actually vary depending on the circuit constant. In the following description, it is assumed that the secondary transfer load in Table 2 is "medium" level.

First, a description will be given of a case where the output terminal voltage VOUT is switched from +3 kV to −1 kV (corresponding to the potential difference level "large"). A waveform W11 represents the change in the output terminal voltage VOUT when the primary side voltage Vi_n is determined to be 6.67 V by using only Table 1. As can be seen from FIG. 16, with W11, the switching will not be completed by the desired switching completion timing. On the other hand, W12 is a waveform representing the change in the output terminal voltage VOUT when the primary side voltage Vi_n (13.67) corrected by using Table 2 is used. With W12, the output terminal voltage VOUT is controlled to −1 kV, which is the goal voltage value, by the desired switching completion timing, without causing overshoot.

W13 is a waveform representing the change in the output terminal voltage VOUT when the output terminal voltage VOUT is switched from +1 kV to −1 kV (corresponding to the potential difference level "medium"). Note that, with W13, 11.67 V (=6.67 V+5 V), which is the primary side voltage Vi_n corrected by using Table 2, is used. As indicated by W13, the output terminal voltage VOUT is controlled to −1 kV, which is the goal voltage value, by the desired switching completion timing, without causing overshoot. Note that when the negative bias is switched to the positive bias, the switching can also be performed at high speed by the desired switching completion timing by using the same method, while suppressing overshoot.

There are two reasons why the appropriate value of the primary side voltage Vi_n differs depending on the potential difference between the positive bias and the negative bias. The first reason is that the charge amount accumulated in the smoothing capacitor C24 of the positive bias circuit 202 varies depending on the positive bias. The second reason is that the charge amount accumulated in the smoothing capacitor C14 of the negative bias circuit 201 varies depending on the negative bias. For the smoothing capacitor C24 of the positive bias circuit 202, it is necessary to rapidly extract the charge of the smoothing capacitor C24 in order to lower the output terminal voltage VOUT by the desired switching completion timing. For example, when the charge amount of the smoothing capacitor C24 is large, or in other words, when the value of the positive bias is large, it is necessary to rapidly extract the charge of the smoothing capacitor C24 by increasing the primary side voltage Vi_p. On the other hand, when the charge amount of the smoothing capacitor C24 is small, or in other words, when the value of the positive bias is small, care should be taken for undershoot. When the force of extracting the charge of the smoothing capacitor C24 is too large, undershoot tends to occur. Therefore, it is necessary to decrease the primary side voltage Vi_n when the value of the positive bias is small. On the other hand, for the smoothing capacitor C14 of the negative bias circuit 201, it is necessary to increase the primary side voltage Vi_n when the absolute value of the negative bias is large. When the value of the negative bias is small, it is necessary to decrease the primary side voltage Vi_n. Thus, with the circuit configuration in which the positive bias circuit 202 and the negative bias circuit 201 are connected in series, it is possible to realize high-speed switching, while suppressing undershoot and overshoot, by giving consideration to the charge amounts of the smoothing capacitors C14 and C24.

Thus, according to Embodiment 3, the correction value of the primary side voltage is determined in accordance with at least the potential difference between the DC voltage of the second polarity and the DC voltage of the first polarity when the voltage supplied to the load 8 is switched from the DC voltage of the second polarity to the DC voltage of the first polarity. As a result, as illustrated by FIG. 16, it is possible to realize high-speed switching while suppressing undershoot and overshoot. Note that the present invention may be applied not only when the positive bias is switched from the negative bias, but also when the negative bias is switched from the positive bias.

Table 2 holds the correspondence between the combination of the magnitude of the load 8 and the potential difference, and the correction value of the primary side voltage. However, Table 2 may hold the correspondence between the potential difference and the correction value of the primary side voltage. Likewise, Table 2 may hold the correspondence between the magnitude of the load 8 and the correction value of the primary side voltage. That is, the correction voltage of the primary side voltage Vi_n, Vi_p may be determined only from the potential difference, may be determined only from the magnitude of the load 8, or may be determined from the combination thereof. In particular, by determining the correction voltage from the combination of the magnitude of the load 8 and the potential difference, it is possible to achieve high-speed switching more accurately while suppressing undershoot and overshoot.

The load 8 may be determined only from the environmental state, may be determined only from the durability state, or may be determined from the combination of the environmental state and the durability state. Giving consideration to the environmental state makes it possible to appropriately determine the load 8 under various environments. Also, giving consideration to the durability state makes it possible to appropriately determine the load 8 under various durability states. If the accuracy of the load 8 is increased, the accuracy of the correction voltage of the primary side voltage Vi_n, Vi_p is also increased. Accordingly, undershoot and overshoot can be more easily suppressed.

Note that the techniques described in Embodiment 1 and Embodiment 2 can also be applied to Embodiment 3. For example, it is effective to start the charging of the capacitor that holds the voltage supplied to the primary side of the transformer of the first power supply unit, prior to the thinning out of the clock signal or the switching from the DC voltage of the second polarity to the DC voltage of the first polarity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-183402, filed Sep. 4, 2013, and Japanese Patent Application No. 2013-183405, filed Sep. 4, 2013, which are hereby incorporated by reference herein in their entirety.

What is claimed is:

1. A voltage generating apparatus comprising:
   a first power supply unit configured to output a DC voltage of a first polarity; and
   a second power supply unit configured to output a DC voltage of a second polarity that is different from the first polarity, the voltage generating apparatus selectively supplying the DC voltage of the first polarity from the first power supply unit or the DC voltage of the second polarity from the second power supply unit to a load,
   wherein the first power supply unit includes:
   a control unit configured to generate a clock signal; and
   a switch unit configured to perform switching in accordance with the clock signal supplied from the control unit, and
   a cycle of the clock signal in a period during which the DC voltage of the second polarity is output is shorter than a cycle of the clock signal in the period during which a state outputting the DC voltage of the second polarity is switched to a state outputting the DC voltage of the first polarity.

2. The voltage generating apparatus according to claim 1, wherein the control unit starts charging a capacitor that holds a voltage supplied to a primary side of a transformer of the first power supply unit, prior to switching the voltage supplied to the load from the DC voltage of the second polarity to the DC voltage of the first polarity.

3. The voltage generating apparatus according to claim 1, wherein the first power supply unit includes:
   a voltage detection unit configured to detect the voltage supplied to the load;
   a comparison unit configured to compare a reference voltage that is set by the control unit and the voltage detected by the voltage detection unit; and
   a thinning-out unit configured to thin out the clock signal in accordance with a result of comparison made by the comparison unit, and
   the thinning-out unit starts thinning out the clock signal when the voltage detected by the voltage detection unit reaches the reference voltage.

4. The voltage generating apparatus according to claim 3, wherein the control unit changes the reference voltage from a first value to a second value that is smaller than the first value in a process in which the voltage supplied to the load is switched from the DC voltage of the second polarity to the DC voltage of the first polarity.

5. The voltage generating apparatus according to claim 3, wherein the thinning-out unit variably controls a thinning-out amount of the clock signal.

6. The voltage generating apparatus according to claim 1, wherein the control unit determines a timing of starting the thinning-out of the clock signal, in accordance with an environmental state, the DC voltage of the first polarity, or the DC voltage of the second polarity.

7. The voltage generating apparatus according to claim 2, wherein the first power supply unit includes:
   a transformer configured to boost a primary side voltage to generate a secondary side voltage; and
   a voltage supply unit configured to supply the primary side voltage, and
   the control unit changes a goal voltage of the primary side voltage from a first voltage to a second voltage that is lower than the first voltage in a process in which the voltage supplied to the load is switched from the DC voltage of the second polarity to the DC voltage of the first polarity.

8. The voltage generating apparatus according to claim 7, wherein the control unit controls the goal voltage of the primary side voltage by changing a duty ratio of a pulse signal supplied to the voltage supply unit.

9. The voltage generating apparatus according to claim 7, wherein the control unit determines a timing of switching from the first voltage to the second voltage, in accordance with an absolute moisture content of an atmosphere, the DC voltage of the first polarity, or the DC voltage of the second polarity.

10. The voltage generating apparatus according to claim 1, wherein the first polarity is positive polarity, and the second polarity is negative polarity.

11. An image forming apparatus comprising:
    a transfer unit configured to transfer a toner image from an image carrier to a sheet; and
    an application unit configured to apply a transfer voltage or a cleaning voltage to the transfer unit,
    wherein the application unit is a voltage generating apparatus comprising: a first power supply unit configured to output a DC voltage of a first polarity; and a second power supply unit configured to output a DC voltage of a second polarity that is different from the first polarity, the voltage generating apparatus selectively supplying the DC voltage of the first polarity from the first power supply unit or the DC voltage of the second polarity from the second power supply unit to the transfer unit, the first power supply unit includes:

a control unit configured to generate a clock signal; and a switch unit configured to perform switching in accordance with the clock signal supplied from the control unit, the clock signal is thinned out in a period during which a state outputting the DC voltage of the second polarity is switched to a state outputting to the DC voltage of the first polarity, and the application unit applies the first DC voltage to the transfer unit as the cleaning voltage, and applies the second DC voltage to the transfer unit as the transfer voltage.

12. The image forming apparatus according to claim 11, wherein the application unit applies the cleaning voltage to the transfer unit in a period after a preceding sheet has passed through the transfer unit and before a subsequent sheet arrives at the transfer unit.

* * * * *